(12) United States Patent
Kondo

(10) Patent No.: US 7,504,061 B2
(45) Date of Patent: Mar. 17, 2009

(54) METHOD OF DECORATING LARGE PLASTIC 3D OBJECTS

(75) Inventor: Hiroko Kondo, Okazaki (JP)

(73) Assignee: Leonhard Kurz GmbH & Co., KG, Furth (DE)

( * ) Notice: Subject to any disclaimer, the term of this patent is extended or adjusted under 35 U.S.C. 154(b) by 404 days.

(21) Appl. No.: 10/513,494

(22) PCT Filed: May 8, 2002

(86) PCT No.: PCT/EP02/05408

§ 371 (c)(1),
(2), (4) Date: Jun. 15, 2006

(87) PCT Pub. No.: WO03/095237

PCT Pub. Date: Nov. 20, 2003

(65) Prior Publication Data

US 2006/0231983 A1    Oct. 19, 2006

(51) Int. Cl.
*B29C 51/10* (2006.01)
(52) U.S. Cl. .................... 264/510; 264/571
(58) Field of Classification Search .............. 264/510, 264/571
See application file for complete search history.

(56) References Cited

U.S. PATENT DOCUMENTS

| | | | |
|---|---|---|---|
| 3,493,640 A * | 2/1970 | Richie | .................... 264/516 |
| 4,687,680 A | 8/1987 | Narui et al. | |
| 4,838,973 A | 6/1989 | Mentzer et al. | |
| 5,125,994 A | 6/1992 | Harasta et al. | |
| 5,318,660 A | 6/1994 | Olsen et al. | |
| 5,525,290 A * | 6/1996 | Carpenter | ................... 264/510 |
| 5,795,420 A | 8/1998 | English | |

FOREIGN PATENT DOCUMENTS

| | | |
|---|---|---|
| DE | 199 40 244 A 1 | 4/2000 |
| EP | 1 125 764 A1 | 11/2001 |
| GB | 2 315 038 A | 1/1998 |
| GB | 2 345 661 A | 6/2000 |
| JP | 07232499 | 9/1995 |
| WO | WO 94/26500 | 11/1994 |

\* cited by examiner

*Primary Examiner*—Suzanne E. McDowell
(74) *Attorney, Agent, or Firm*—Hoffmann & Baron, LLP

(57) ABSTRACT

A method of decorating a three-dimensional object, which performs a thermal transfer by causing a flat thermal transfer foil to adhere favorably to a molded article of a comparatively tall shape. Providing a planar heater (17) at the side of a support jig (5) to partially heat and extend a thermal transfer foil (71) and fixing a shape cutter (19) to the side of a molded rubber mold (3) and mounting a cutting mechanism which cuts the thermal transfer coil immediately before the molded rubber mold reaches the drop point, so that the thermal transfer foil is favorably caused to favorably adhere to the molded article (6).

3 Claims, 29 Drawing Sheets

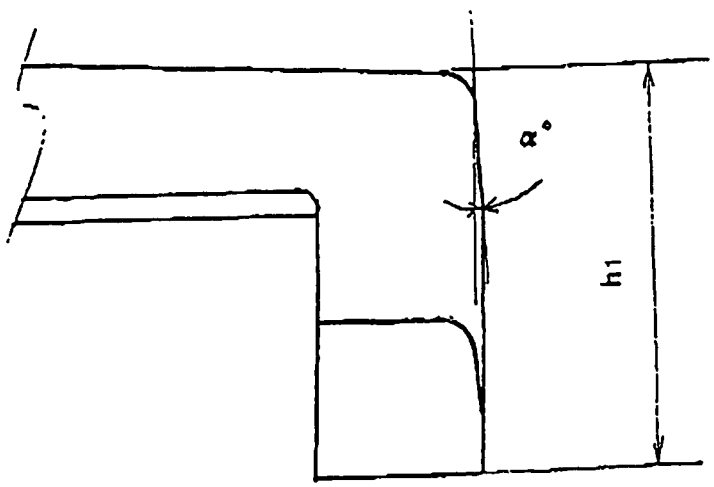
FIG. 20
FIG. 21
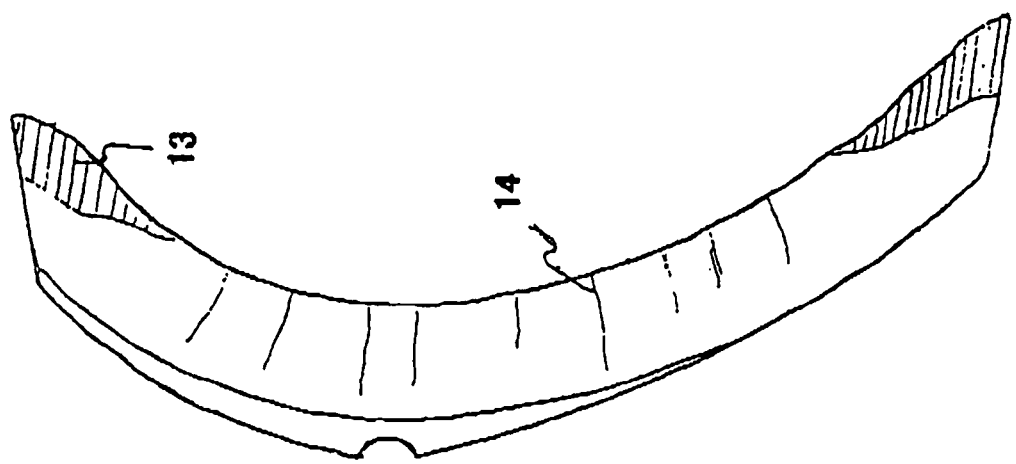

FIG. 22
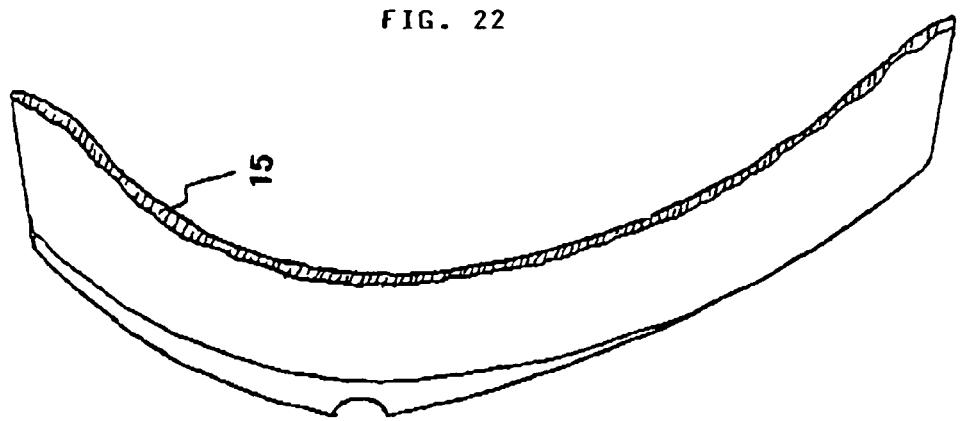
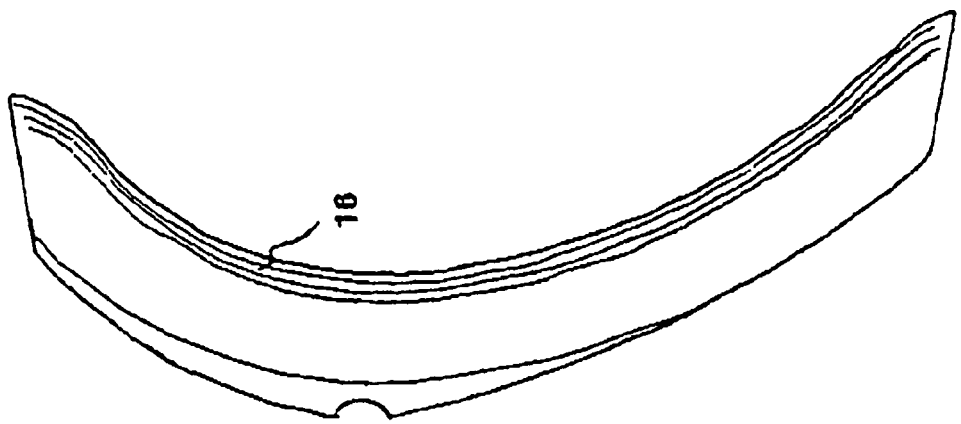
FIG. 23

FIG. 36

|  | h1 | h2 | ANGLE α | R |
|---|---|---|---|---|
|  | TOTAL HEIGHT | WALL FACE HEIGHT | WALL FACE ANGLE | WALL FACE R |
|  | mm | mm | DEGREE | mm |
| MOLDED ARTICLE SHOWN IN FIG. 9 | 25 | 18 | 55 | 50 |
| MOLDED ARTICLE SHOWN IN FIG. 13 | 44 | 23 | 10 | 18 |
| MOLDED ARTICLE SHOWN IN FIG. 17 | 115 | 30 | 3 | 10 |

METHOD OF DECORATING LARGE PLASTIC 3D OBJECTS

This application claims priority based on an International Application filed under the Patent Cooperation Treaty, PCT/EP02/05408.

TECHNICAL FIELD

The present invention relates to a method used for the decoration of plastic molded articles, and more particularly relates to a thermal transfer technique and the so-called three-dimensional hot stamp decoration technique, which performs decoration by causing a thermal transfer foil to cover a surface of a large plastic molded article having a three-dimensional shape; clamping the perimeter of the thermal transfer foil; attaching the foil to the molded article shape by means of vacuum degassing; and thereafter lowering and raising a molded rubber mold.

BACKGROUND OF THE INVENTION

As methods for decorating a surface of a large plastic molded article (referred to as "molded article" hereinafter), methods exist which perform decoration by transferring a thermal transfer foil design to a surface of a molded article by causing a thermal transfer foil to cover a molded article; pressing the perimeter of the thermal transfer foil; attaching the thermal transfer foil to the molded article by means of vacuum extraction, whereupon the foil adopts a shape like that of the molded article; and lowering and raising a heated "molded rubber mold". This method is known as three-dimensional hot stamping. This technique will be described in detail hereinbelow using specific examples.

First, a molded article such as that illustrated in FIG. 1 is presented as an article for decoration. The dimensions of this molded article are: length 900 mm, width 300 mm, height 50 mm, and wall face height 25 mm. Meanwhile, an outside view and a cross-sectional view of the molded rubber mold for hot stamping are shown in FIGS. 2, 3. A bar-shaped heater 9 is fitted thereon, and [the molded rubber mold with heater] is mounted on a stamp device which has a lowering and raising mechanism as shown in FIG. 4. This stamp device has a slide table 4 on whose inner face a support jig 5, which is for securing a product made of aluminum manufactured so as to match the shape of the molded article (referred to as "support jig" hereinafter), is arranged.

With regard to the mold support jig and device as described above, first the molded article 6 is fixed to the top of the support jig 5 as shown in FIG. 4. Thereupon, a thermal transfer foil 7 is set using a foil chuck over a space into which the slide table is to be introduced once. Next, the slide table is moved to below the molded rubber mold as far as the state in FIG. 5, and the thermal transfer foil 7 is secured by lowering the foil clamp 8. Then, cutting of the thermal transfer foil 7 on the roll side is performed using a foil cutter. Next, by removing the air in an enclosure 10 contained by the support jig 5 and the molded article 6, using a vacuum pump, the thermal transfer foil 7 is caused to adhere to the molded article 6. Following adequate adhesion of the thermal transfer foil 7, heat and pressure are applied by lowering the molded rubber mold 3 as shown in FIG. 6, such that the design is transferred to the molded article 6. Thereafter, after raising the molded rubber mold 3 as shown in FIG. 7, the position of the slide table 4 is moved as shown in FIG. 8, and after peeling the thermal transfer foil 7 from the surface of the molded article 6, the molded article 6 thus decorated is removed. Of course, the peeling of the thermal transfer foil 7 may also be performed following removal of the molded article 6 from the support jig 5. Following peeling of the thermal transfer foil 7, in cases where foil burrs remain on the grating portions, the grating portions are rubbed using a sponge or the like, and then, by running a cleaner, finishing of the decorated article is performed.

In addition, methods in which the thermal transfer foil 7 is supplied continuously using a foil roll, and the thermal transfer foil 7 is peeled in foil peeling bars after transfer have also already been implemented as mass production methods.

PROBLEMS TO BE SOLVED BY THE INVENTION

There are limitations on molded article shapes which can be decorated in mass production by performing three-dimensional hot stamping. This is because, with a method of the kind described above, the surface of a large plastic molded article having a three-dimensional shape is decorated by hot stamping using a thermal transfer foil, and since it is necessary to cause a thermal transfer foil, which is a two-dimensional flat surface, to adhere to a molded article with a three-dimensional body structure, the side walls cannot be made very high. When, during vacuum extraction, the molded rubber mold is caused to drop in a state in which the thermal transfer foil does not adhere as far as the side edges, as shown in FIG. 30, the molded rubber mold makes contact with the thermal transfer foil at the perimeter of the molded article before reaching the drop point, that is, the molded article surface, and the thermal transfer foil is torn (referred to as foil splitting hereinafter). As a result, the vacuum is broken, and the thermal transfer foil is no longer in a state of adhesion to the molded article, meaning that uniform decoration can then not be achieved. In concrete terms, there are large adhesion defects and countless wrinkles are produced.

On account of the state described above, using conventional methods, there are limitations on shapes permitting three-dimensional hot stamp decoration. Since this is judged by combining shape elements, definition is, as a rule, troublesome. However, estimation is possible by combining the following four elements, namely (1) the side wall face shape height $h_1$; (2) the distance $h_2$ from the top of the product to the side edges; (3) the angle $\alpha$ between the side wall face and the horizontal face; and (4) the size of the point of intersection R between the side wall face and the horizontal face.

Further, since there are also cases where the shape changes gradually, there are also times when, as a rule, the side shape cannot be judged using figures alone.

For example, one example of a shape which did not generate problems, among shapes which have undergone mass production, may be described in detail using the figures as follows. That is, a side upright portion is of a comparatively undulating shape, where the angle $\alpha$ is an obtuse angle, as shown in FIGS. 9 to 12.

Nevertheless, in accordance with modifications to air conditioner grill designs, products have emerged having a shape in which, as shown in FIGS. 13 to 16 and FIGS. 17 to 20, the distance $h_2$ from the top of the product to the molded article side edges is large, and the side wall face shape depth $h_1$ is deep. Further, there have been a great number of demands from customers for the design decoration of this method to decorate such air conditioner grills with a deeper shape.

When performing decoration using a conventional method, for the shape of FIGS. 9 to 12, it is possible, during vacuum extraction, to cause a thermal transfer foil to adhere as far as the side edges of the molded article, and to uniformly transfer a design to the molded article by causing a molded rubber mold to drop [thereupon].

However, in the case of the shape in FIG. 13 to 16, it proves difficult for the thermal transfer foil to reach as far as the side edges of the molded article during vacuum extraction, and foil splitting of the kind described above is produced, which means that three-dimensional hot stamp decoration is rendered impossible.

For a long time, methods have been considered which position the thermal transfer foil below a molded rubber mold, perform adequate heating, and make it easier to extend the thermal transfer foil during vacuum extraction. Nevertheless, because the thermal transfer foil makes contact with the molded article after the clamping plate has dropped, the thermal transfer foil is cooled instantly, Also, the thermal deformation temperature of the molded article (HIPS, ABS) is generally equal to or less than 100° C., and since this is lower than 120° C., which is the thermal deformation temperature of the foil (PET film), it is not possible to heat the thermal transfer foil and the molded article together during vacuum extraction. As above, during vacuum extraction, heating and extending the PET film alone using a shape rubber mold was difficult.

Also with the molded articles of the shape in FIGS. 17 to 20, before the molded rubber mold drops to cause the thermal transfer of the foil design, in other words, before the molded rubber mold reaches the drop point, the molded rubber mold makes contact with the extended thermal transfer foil, and, as a result of the foil being torn thereby, vacuum breakage then occurs, the design transfer itself becomes impossible, and adhesion defects and wrinkles are produced as shown in FIG. 21. Further, even if the tear strength of the foil is adequate, and, luckily, vacuum breakage as a result of foil splitting is not produced, as a result of adhesion defects at the edges, as shown in FIG. 22, and the production of ring-shaped cuts as shown in FIG. 23, a conforming article cannot be obtained. These ring-shaped cuts are foil contraction marks which remain on the molded article as a result of the foil thus warmed being cooled once again and contracting after the molded rubber mold is raised.

As described above, there are limitations in causing a two-dimensional thermal transfer foil to adhere to a molded article which is a three-dimensional shape, and even in the absence of shape limitations, mass production thereof has been impossible.

SUMMARY OF THE INVENTION

After giving sufficient consideration to the conditions and technical problems above, as a result of committed research, the present inventors arrived at the invention of a method for decorating the surface of a large plastic molded article having a deeper three-dimensional shape, using a thermal transfer foil and a molded rubber mold.

The constitution and a summary of the procedure of the present invention will be described in sequential order hereinbelow.

First, a description will be provided for the first invention which appears in claim 1. This invention corresponds to the shape in FIG. 13 to FIG. 16, but, as shown in FIGS. 24 and 25, a planar heater 17 is provided at the side of the support jig of the side portions of the molded article 6. By heating the thermal transfer foil using this planar heater 17, during vacuum extraction, the thermal transfer foil is partially heated, extended, and caused to adhere to the molded article. The molded rubber mold may have a conventional constitution.

Next, a description will be provided for the second invention which appears in claim 2. This invention corresponds to the shape in FIG. 17 to FIG. 20, but it is only with the first invention that the thermal transfer foil cannot reach as far as the side edges of the molded article. As shown in FIG. 26, a shape cutter is fixed to a side portion of the molded rubber mold and a mechanism is mounted that cuts the thermal transfer foil before the molded rubber mold reaches the drop point.

Further, when slipping of the foil surface on the molded rubber at the edges of the molded article is poor, a lubricant such as silicon grease is applied.

The present invention having the constitution described above, the following actions were identified in the hot stamp decoration of a plastic molded article possessing three-dimensional curved faces of a deep shape.

With the first invention, by using a planar heater to heat the thermal transfer foil in the vicinity of the portion which is to be caused to adhere to a molded article, the thermal transfer foil extends partially, and, conjointly with vacuum extraction, it is possible to cause the thermal transfer foil to adhere to the sides of a deeper shape.

With the second invention, it is possible to cut the thermal transfer foil, which has been extended to its limit using vacuum extraction, immediately before the molded rubber mold reaches the drop point. Following cutting, the tensile strength of the thermal transfer foil is zero, and a molded rubber mold with a deep shape like that shown in FIG. 26 is then covered, the thermal transfer foil is extended to its limit, and, thereafter, even if the thermal transfer foil contracts once again, foil recovery is not observed.

With the third invention, good slipping between the molded rubber surface and the thermal transfer foil surface is afforded, which makes it possible to perform a more reliable thermal transfer. Specifically, edge adherence is better than when there is no application of lubricant.

EFFECTS OF THE INVENTIONS

The following principal effects were obtained by the above actions.

With the first invention, by heating using a planar heater, it is possible to extend the thermal transfer foil and to selectively heat and extend only the neighboring portion which is to be caused to adhere to the molded article. Thus, the thermal transfer foil adheres as far as the edges of the molded article and it is possible to prevent collision between the molded rubber mold and the foil part R when the molded rubber mold drops, whereby favorable decoration can be performed.

With the second invention, by cutting the foil immediately before thermal transfer using a shape cutter on the molded rubber mold, it is possible to remove the tension in the foil which has been extended, using vacuum extraction. As a result, the design of the thermal transfer-foil is transferred as far as the edges of the molded article, and defects of the kind shown in FIG. 22 are not produced. Further, following thermal transfer, even if the molded rubber mold is raised, the production of ring-shaped cuts, as shown in FIG. 23, which is caused by the thermal transfer foil contracting once again, is not observed. Normally, a molded article possessing a shape that accommodates the second invention can also jointly employ the first invention. For this reason, while the thermal transfer foil holds a state of adhesion to the molded article, the foil is cut immediately before thermal transfer, meaning that favorable decoration can be performed also without the production of wrinkles on the decorated molded article being observed.

By combining usage of the third invention with the first invention and the second invention, more favorable three-dimensional decoration can be performed.

As above, as a result of adapting the first invention, second invention, and third invention to the three-dimensional hot stamp decoration technique, it became possible to perform hot stamp decoration on a molded article possessing a three-dimensional shape that is deep which, to date, had been considered difficult to decorate. Further, by using the method of the present invention for a molded article with a shape like that shown in FIGS. 13 to 20, mass production decoration was made possible.

BRIEF DESCRIPTION OF THE DRAWINGS

FIG. 20 is a front view of part of the above-mentioned molded article;

FIG. 21 is a side view of the defects that are produced when three-dimensional hot stamping is performed without using the second invention appearing in claim 2 of the present invention with respect to the molded article shown in FIGS. 17 to 20;

FIG. 22 is a side view of the defects that are produced when three-dimensional hot stamping is performed without using the second invention appearing in claim 2 of the present invention with respect to the molded article shown in FIGS. 17 to 20;

FIG. 23 is a side view of the defects that are produced when three-dimensional hot stamping is performed without using the second invention appearing in claim 2 of the present invention with respect to the molded article shown in FIG. 7;

FIG. 36 is a table showing [values] with reference to the molded article side shapes shown in FIGS. 9 to 20.

DESCRIPTIOM OF PREFERRED EMBODIMENT OF THE INVENTION

The large plastic three-dimensional shape decoration method of the present invention will be described specifically with reference to the drawings. Further, $h_1$ ... the side total height, $h_2$ ... the side face height, and $\alpha°$ ... the side angle, which are appended to the molded article side shapes shown in FIGS. 9 to 12, FIGS. 13 to 16, and FIGS. 17 to 20, are shown in a table in FIG. 36.

Figure 1:
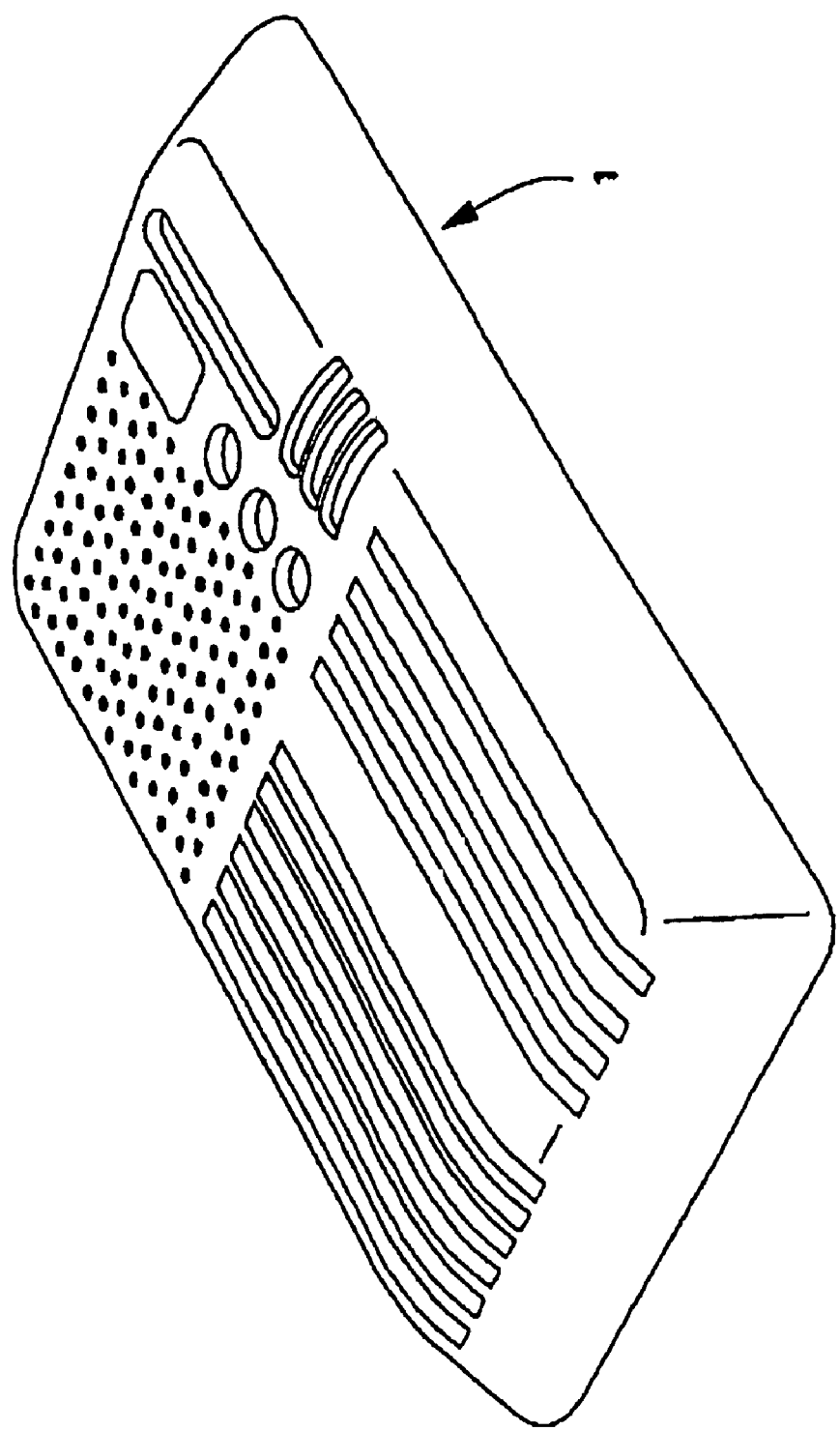
FIG. 1 is a perspective view of one example of a molded article that allows effective surface decoration to be performed by conducting conventional three-dimensional hot stamping.
Figure 2:
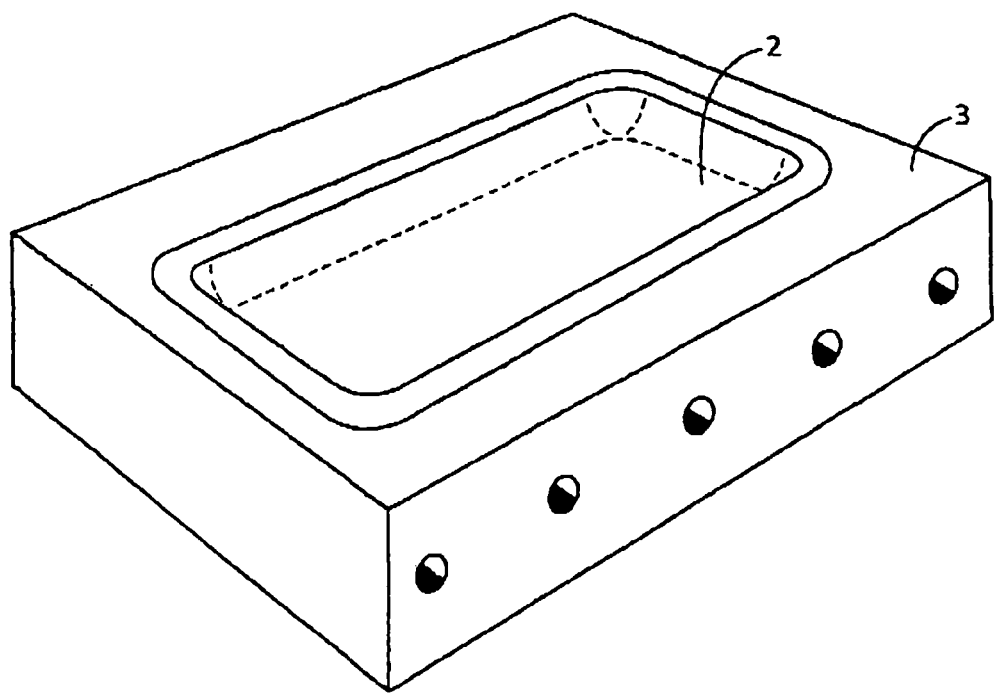
FIG. 2 is a perspective view of a molded rubber mold manufactured in order to implement conventional three-dimensional hot stamping.
Figure 3:
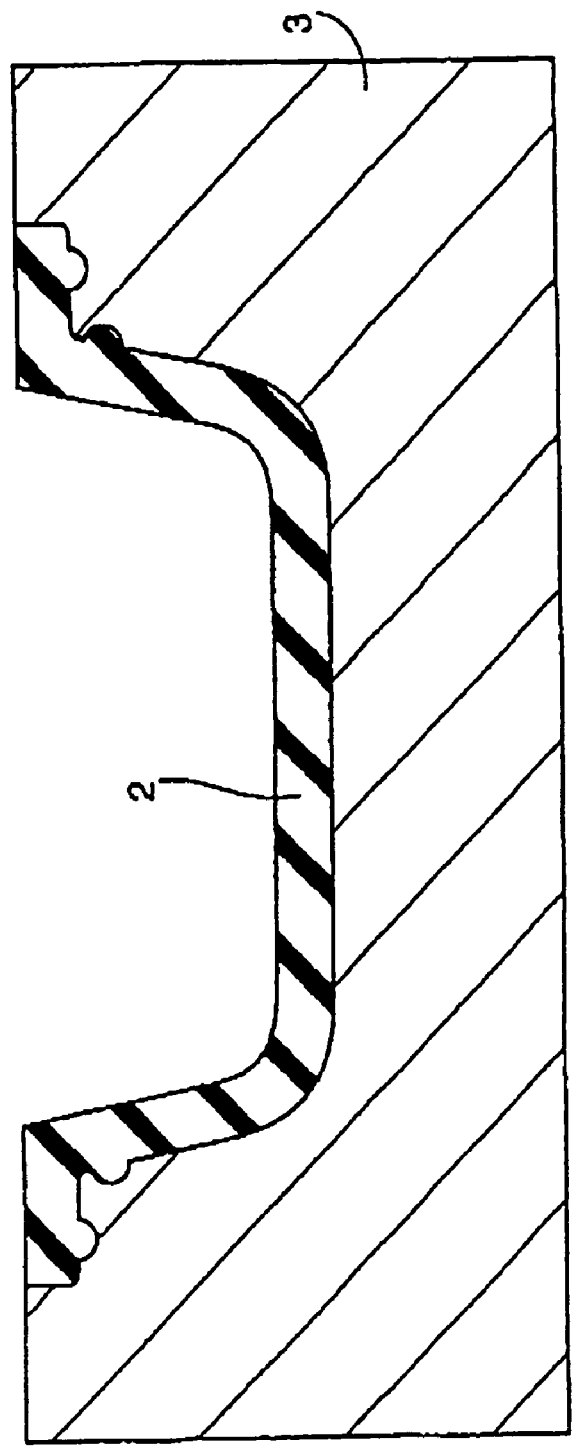
FIG. 3 is a cross-sectional view of a molded rubber mold manufactured in order to implement conventional three-dimensional hot stamping.
Figure 4:
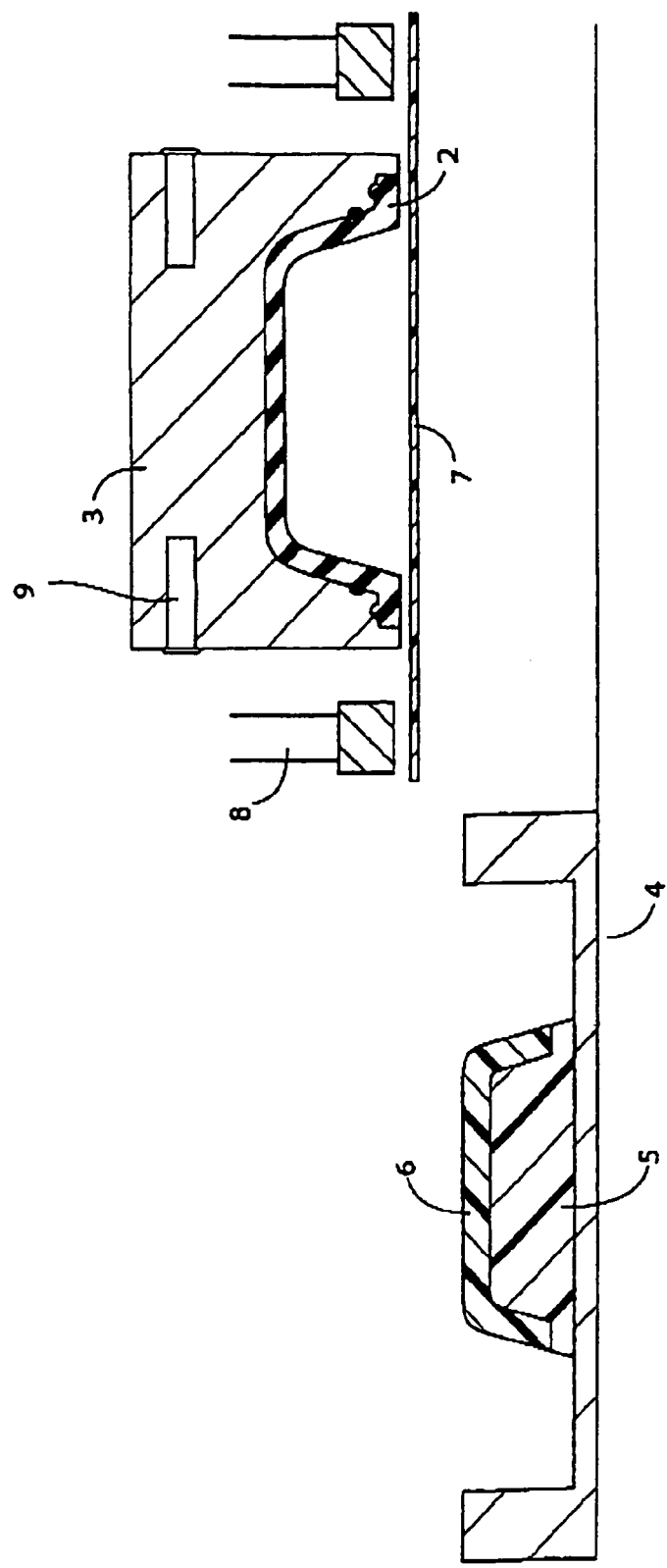
FIG. 4 is a figure showing one state while decorating a large plastic molded article using a molded rubber mold, in a conventional three-dimensional hot stamping method.
Figure 5:
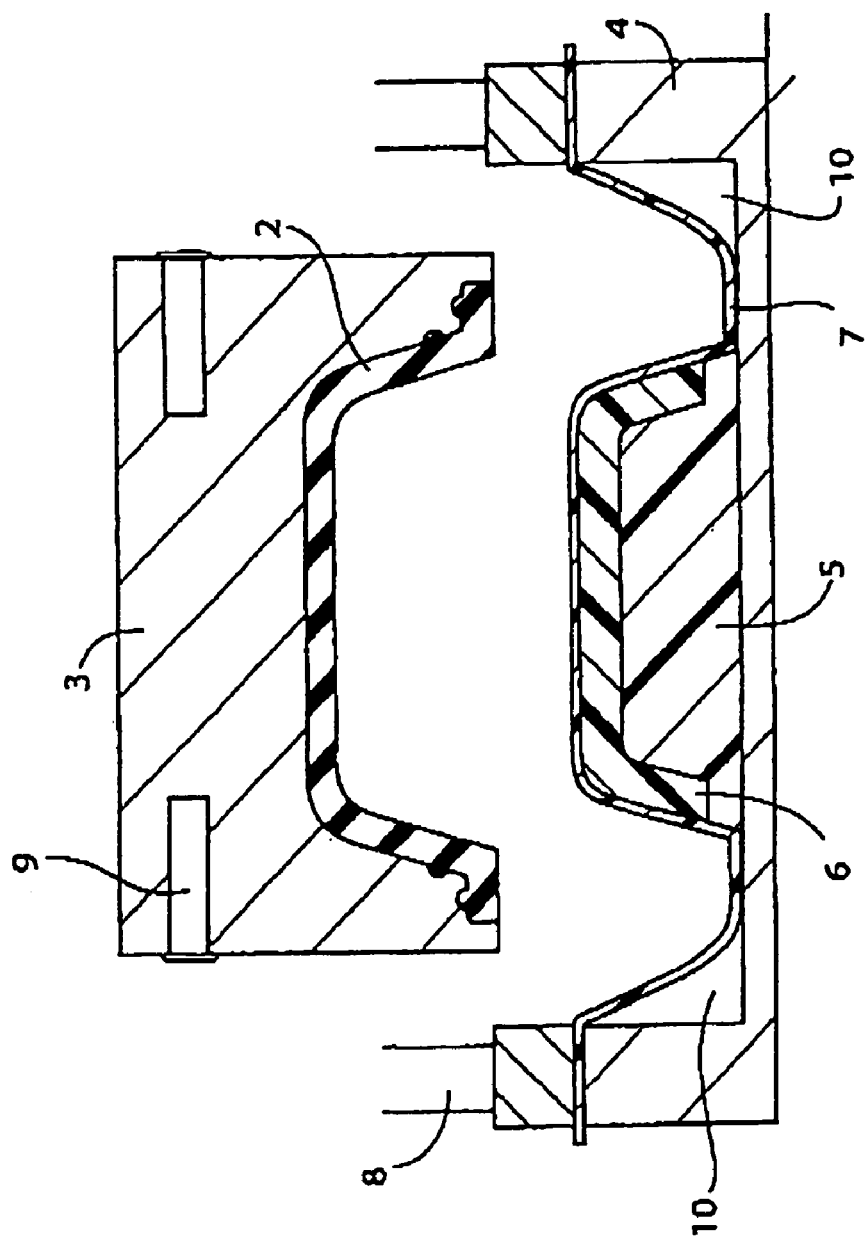
FIG. 5 is a figure showing another state while decorating a large plastic molded article using a molded rubber mold, in a conventional three-dimensional hot stamping method.
Figure 6:
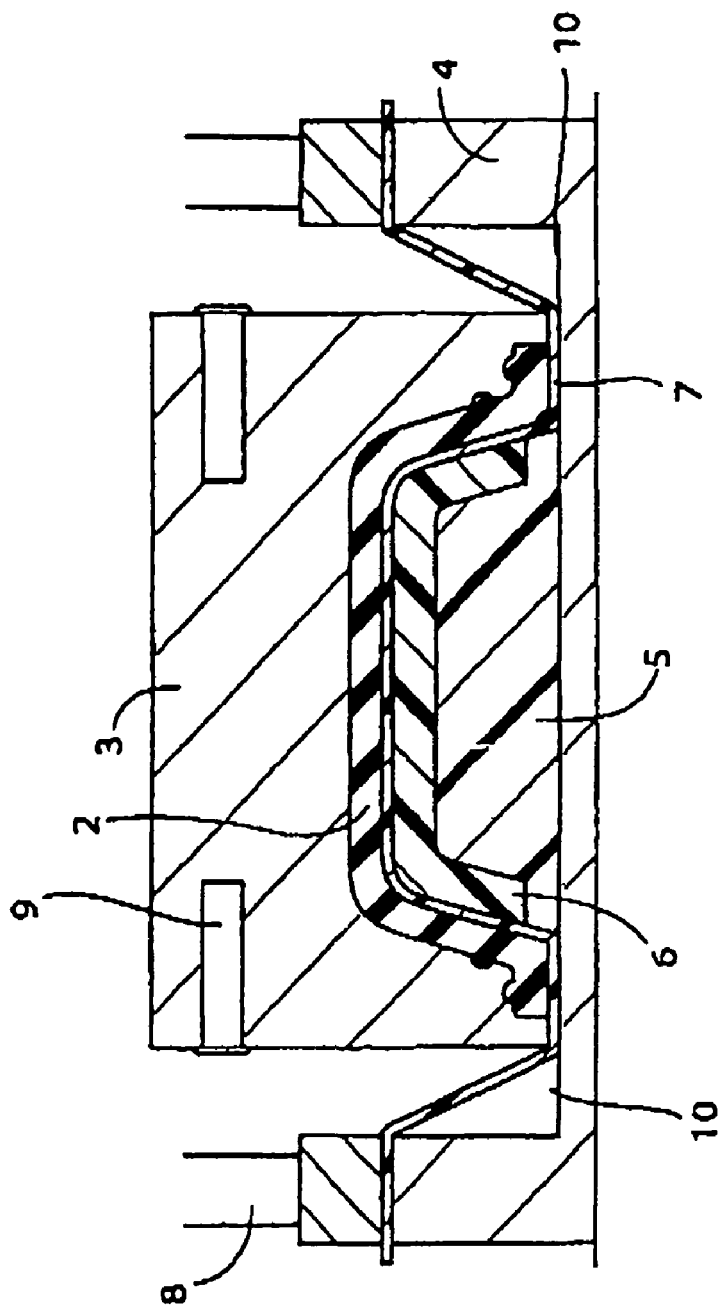
FIG. 6 is a figure showing yet another state while decorating a large plastic molded article using a molded rubber mold, in a conventional three-dimensional hot stamping method.
Figure 7:
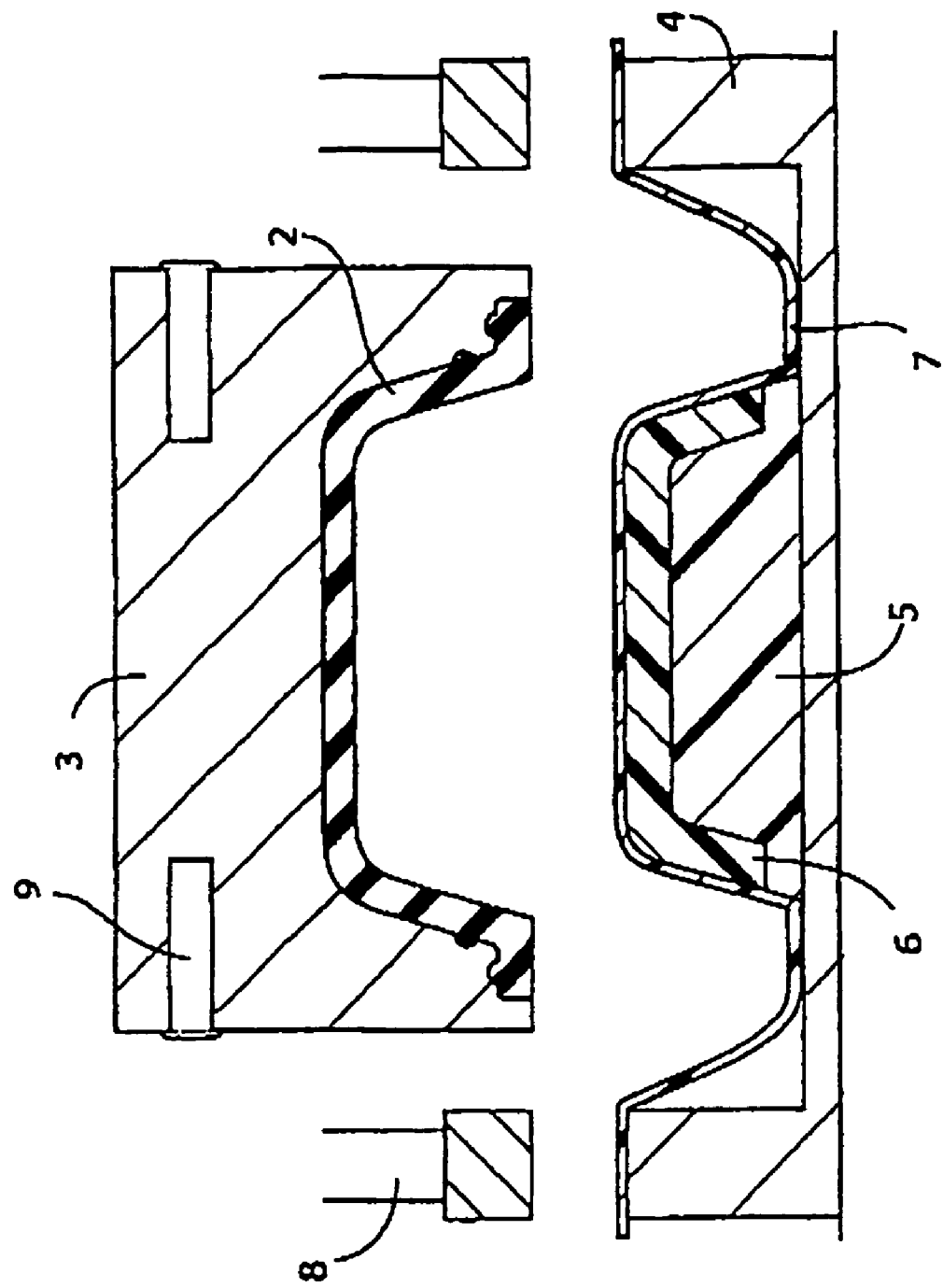
FIG. 7 is a figure showing yet another state while decorating a large plastic molded article using a molded rubber mold, in a conventional three-dimensional hot stamping method.
Figure 8:
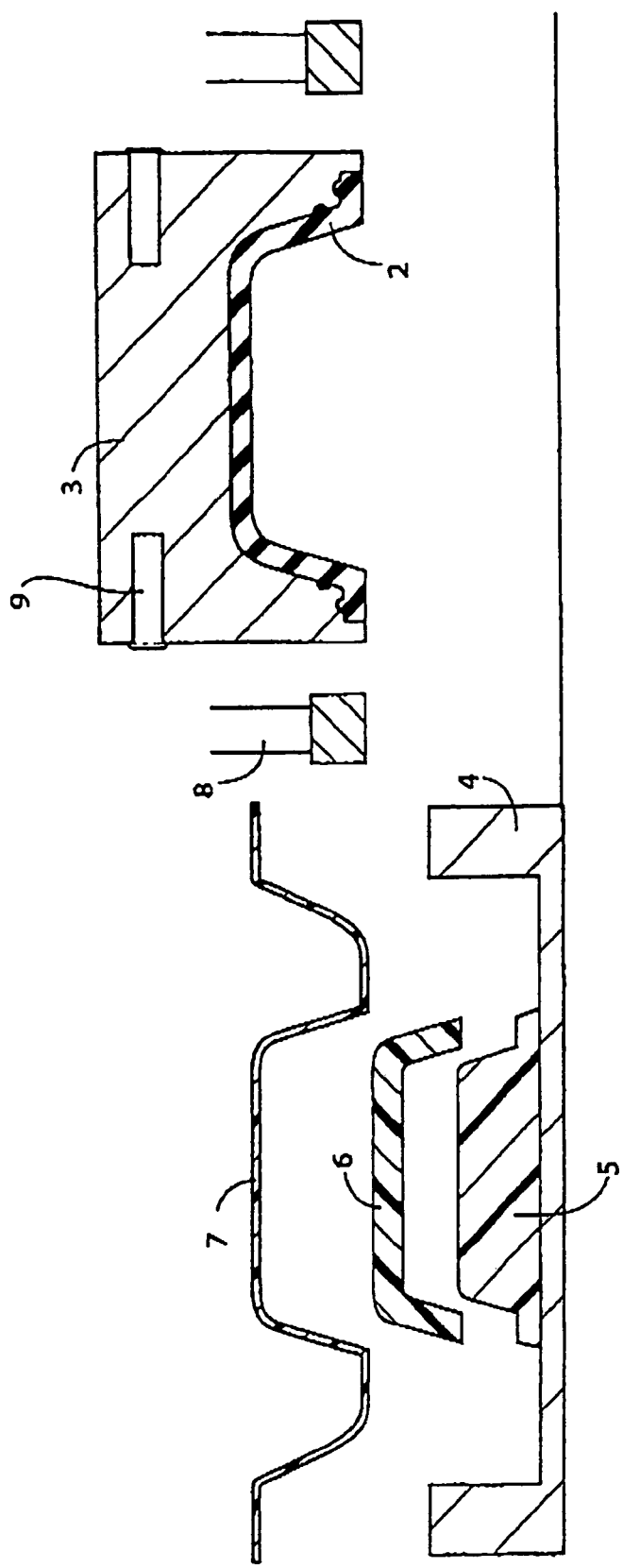
FIG. 8 is a figure showing one state while decorating a large plastic molded article using a molded rubber mold, in a conventional three-dimensional hot stamping method.
Figure 9:
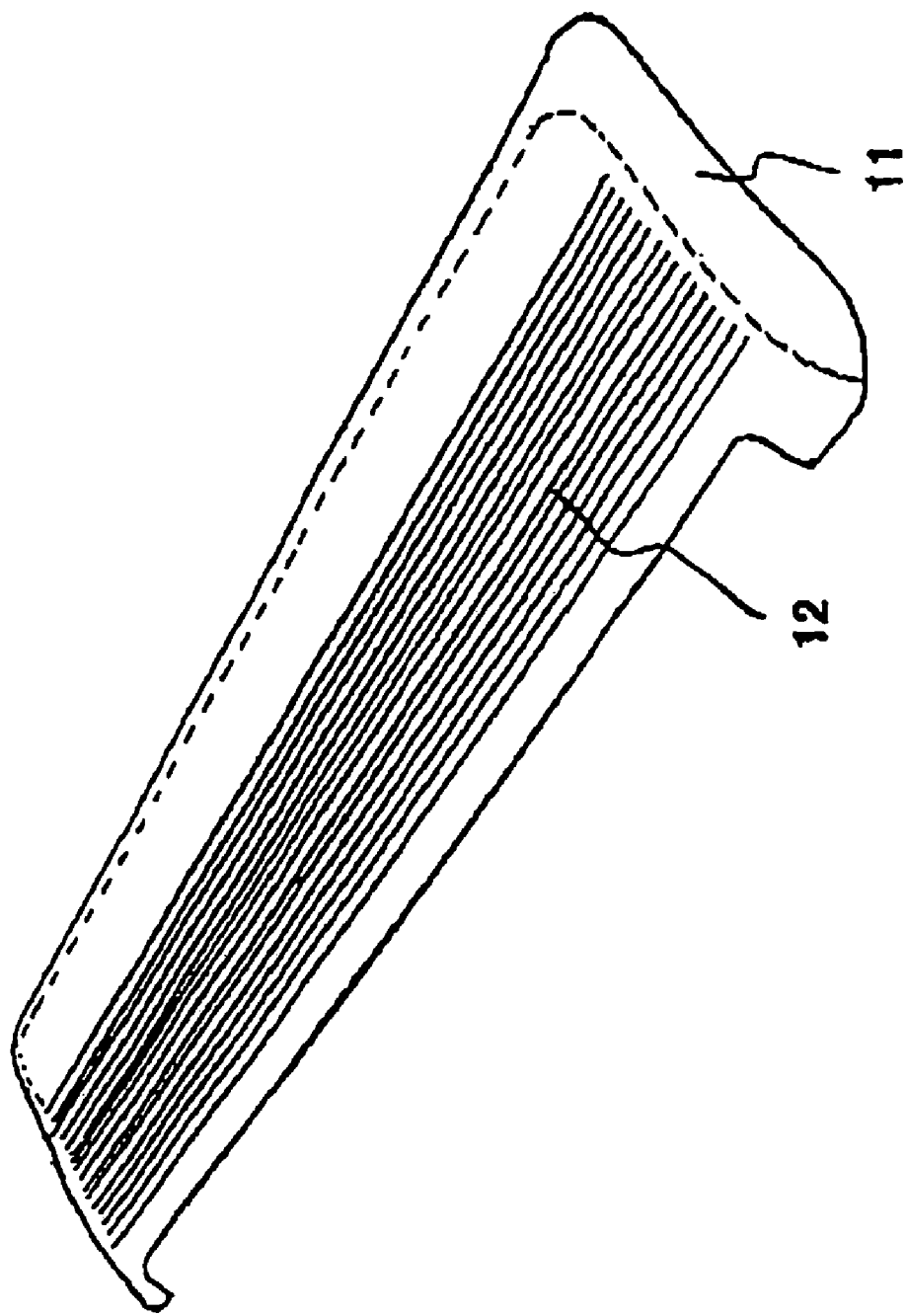
FIG. 9 is a perspective view of a molded article that has been mass-produced in a conventional three-dimensional hot stamping method.
Figure 10:
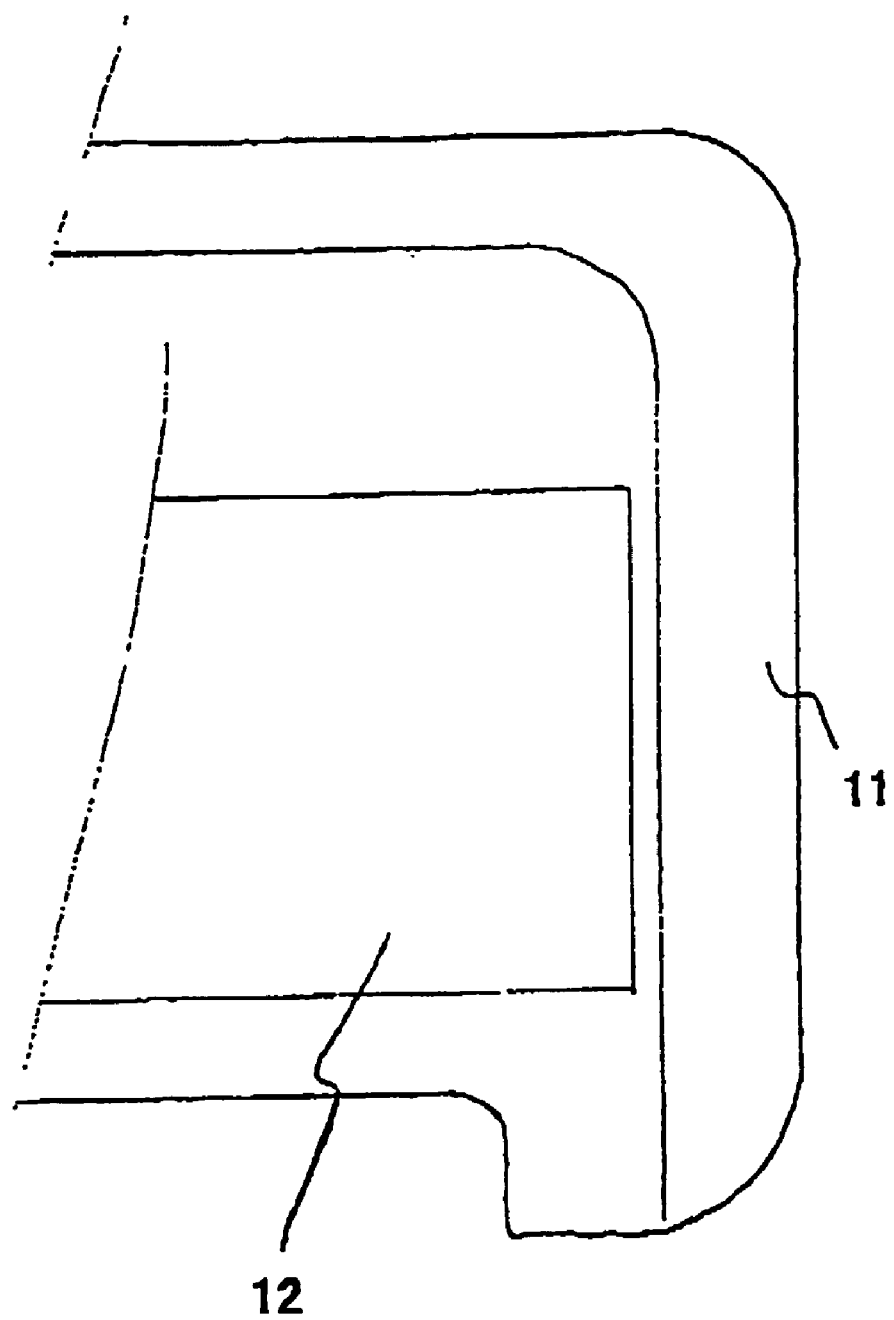
FIG. 10 is a planar view of part of the above-mentioned molded article.
Figure 11:
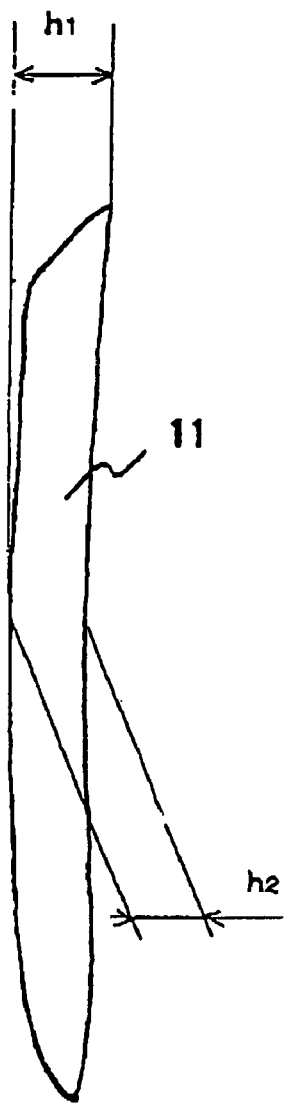
FIG. 11 is a side view of the above-mentioned molded article.
Figure 12:
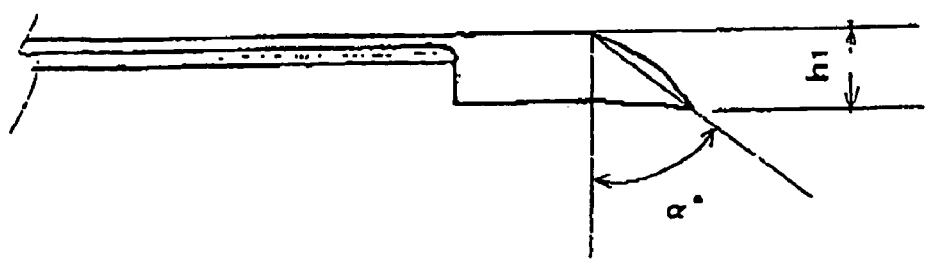
FIG. 12 is a front view of part of the above-mentioned molded article.
Figure 13:
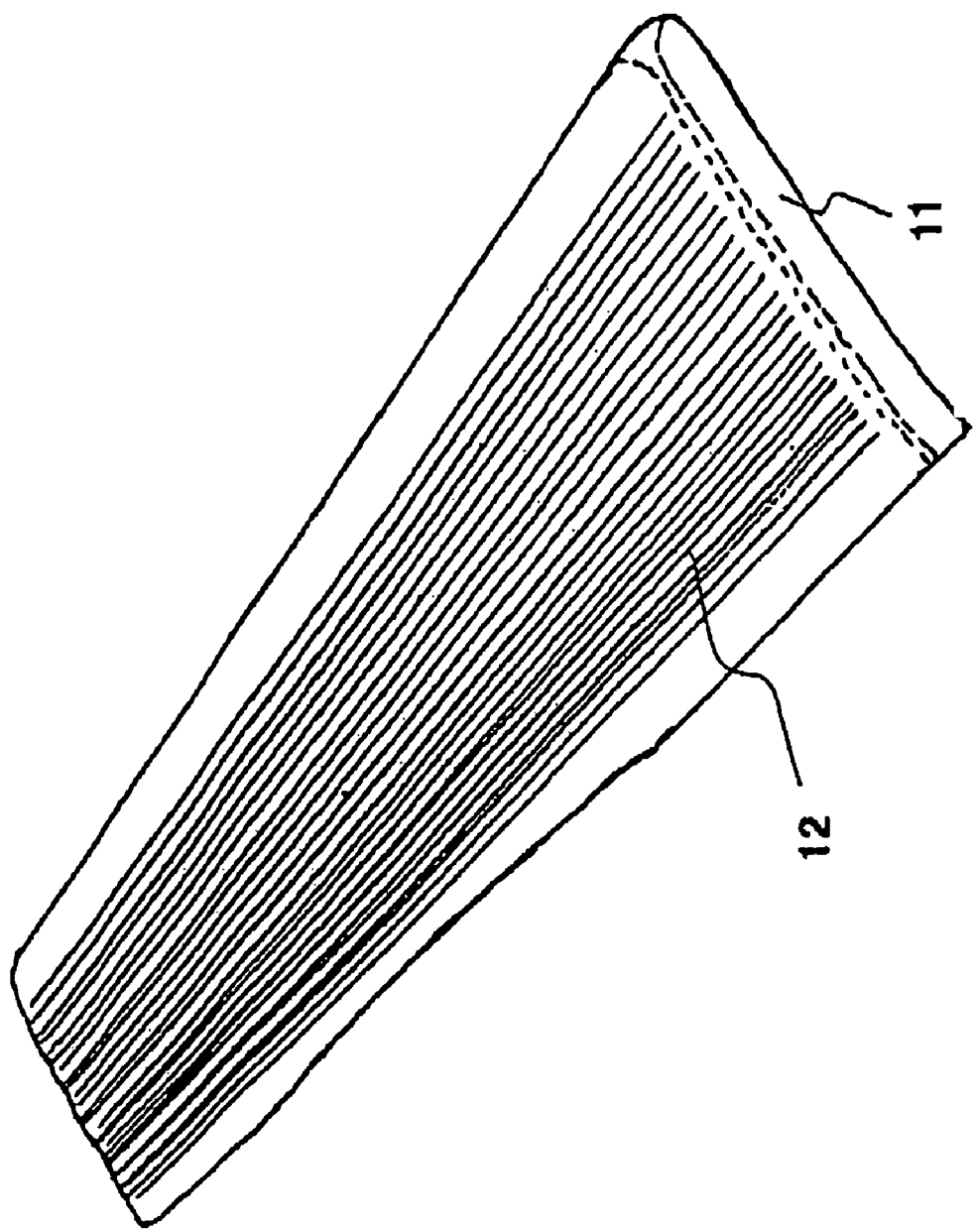
FIG. 13 is a perspective view of a molded article which has been mass-produced using the first invention appearing in claim I of the present invention.
Figure 14:
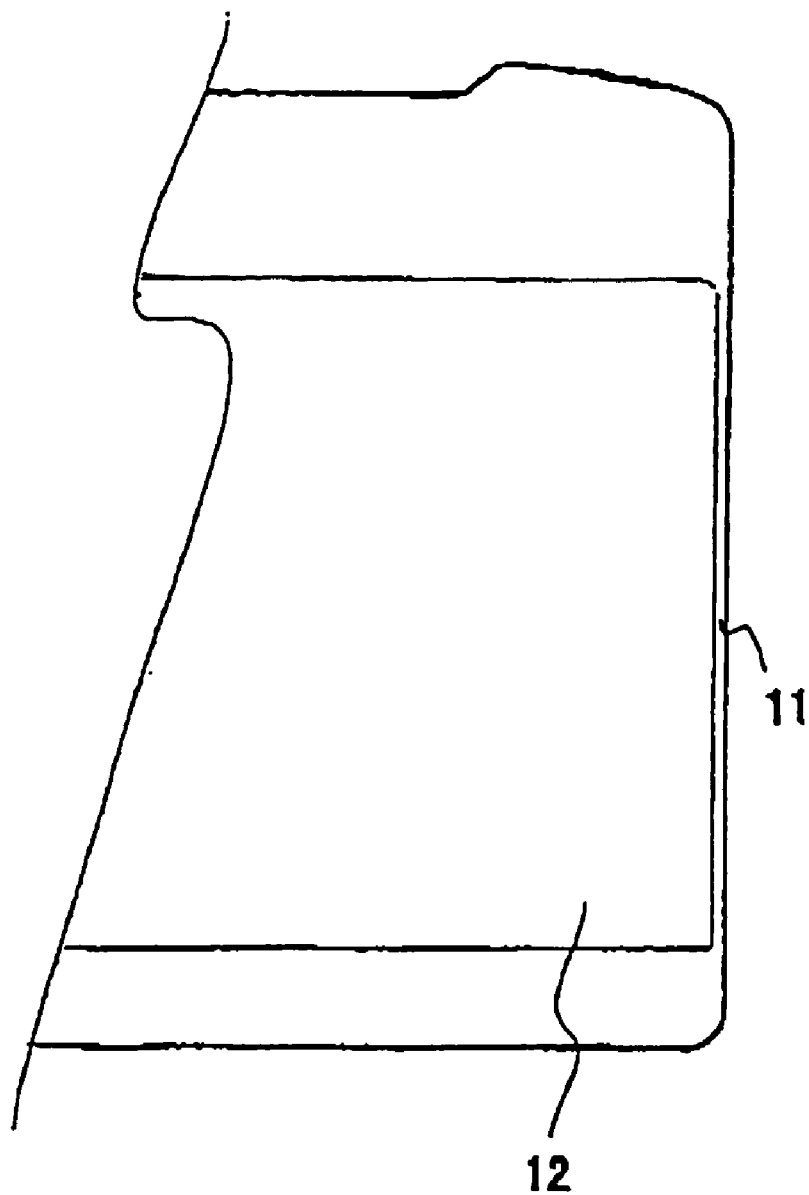
FIG. 14 is a planar view of part of the above-mentioned molded article.
Figure 15:
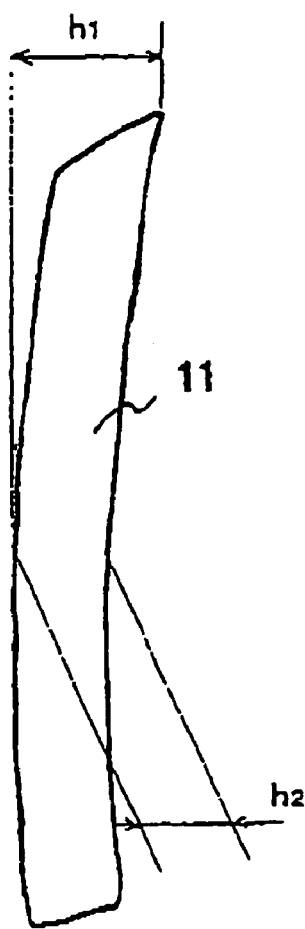
FIG. 15 is a side view of the above-mentioned molded article.
Figure 16:
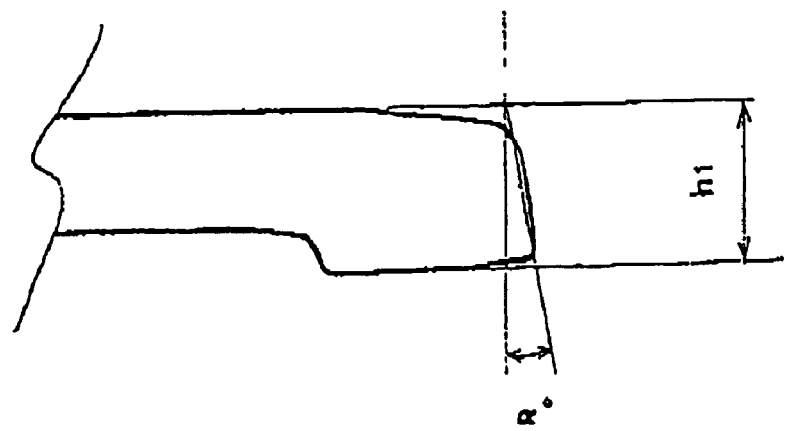
FIG. 16 is a front view of part of the above-mentioned molded article.
Figure 17:
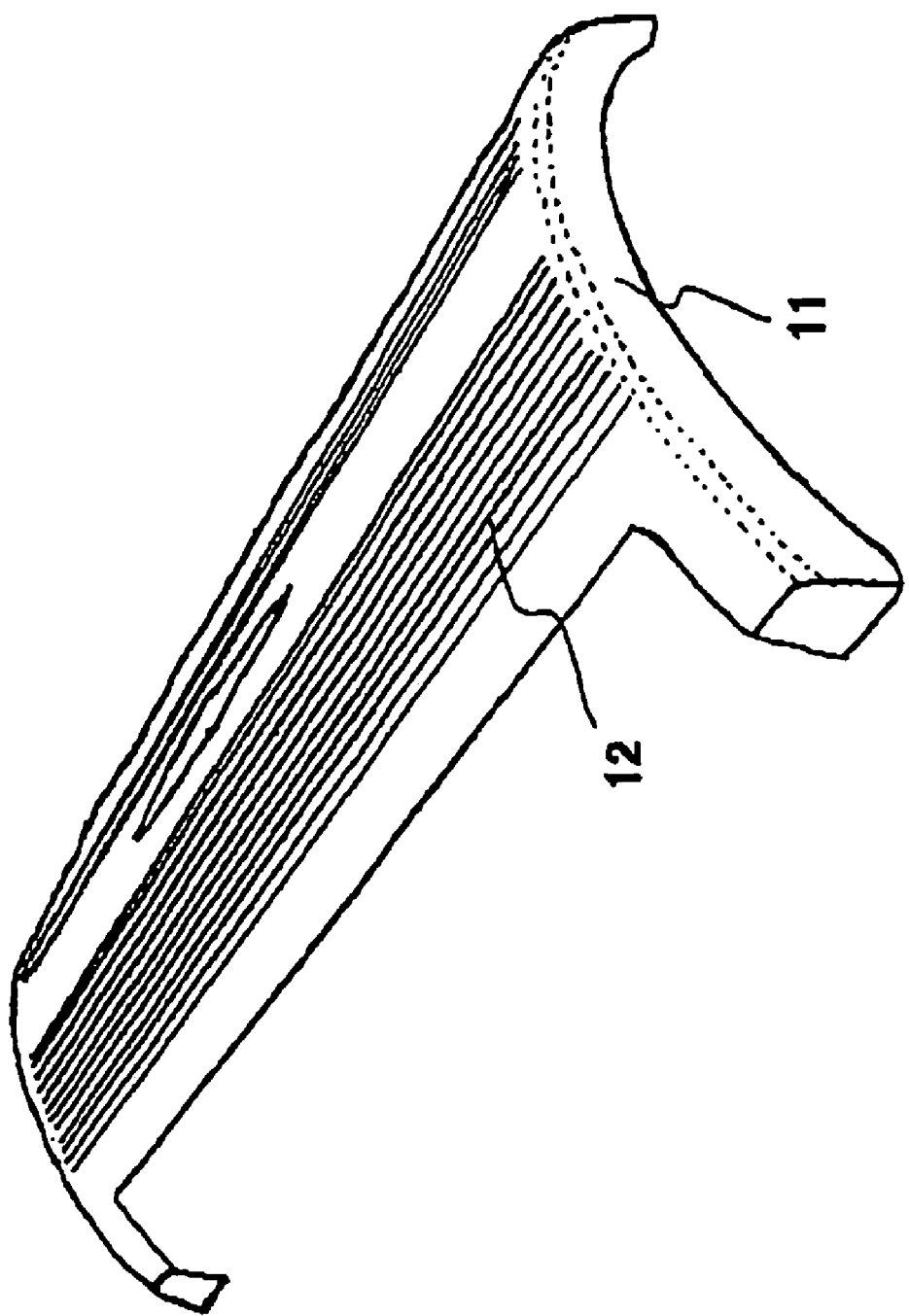
FIG. 17 is a perspective view of a molded article which has been mass-produced in a three-dimensional hot stamping method using the first invention appearing in claim 1 of the present invention and the second invention appearing in claim 2 of the present invention.
Figure 18:
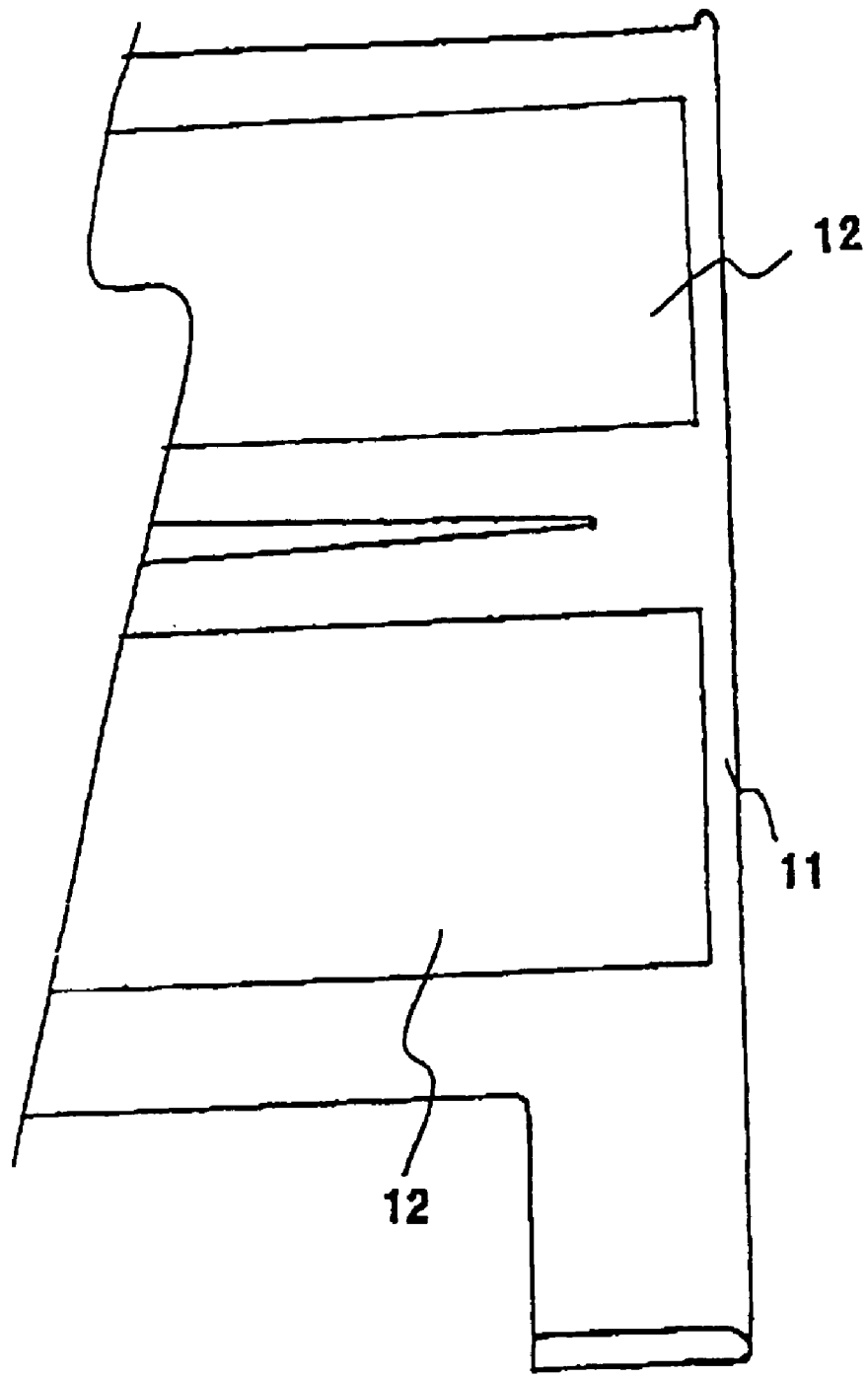
FIG. 18 is a planar view of part of the above-mentioned molded article.
Figure 19:
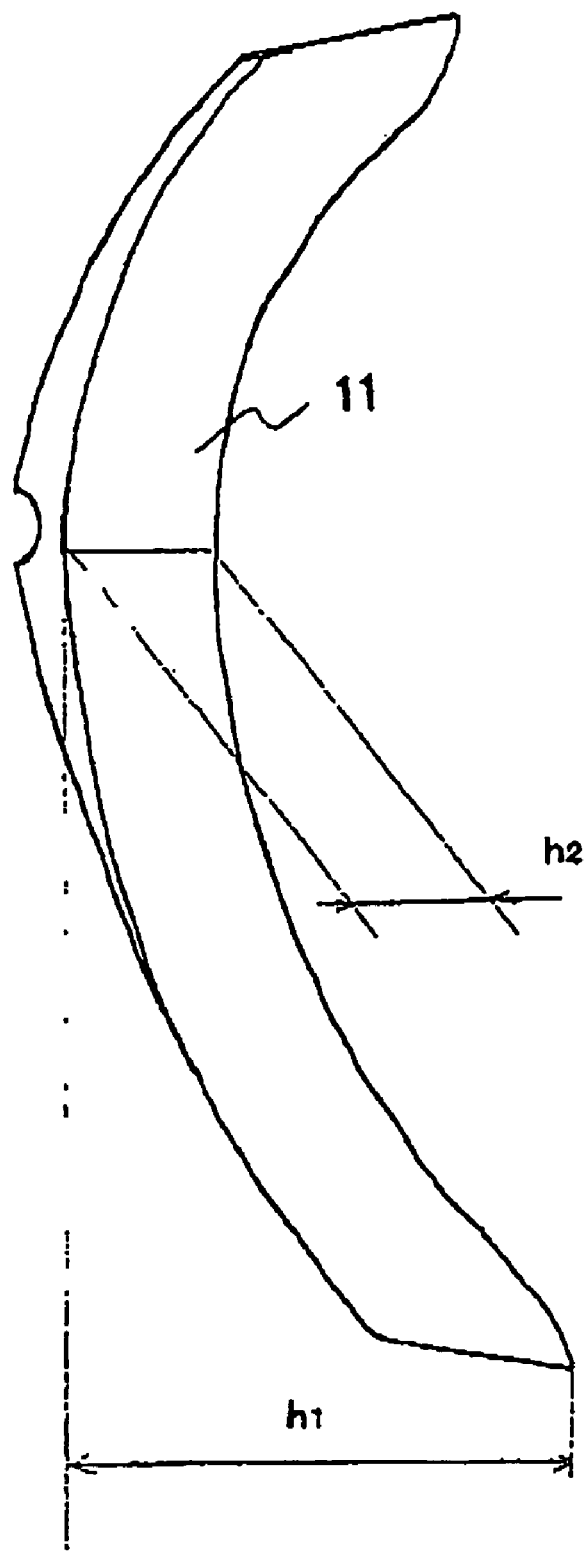
FIG. 19 is a side view of the above-mentioned molded article.
Figure 24:
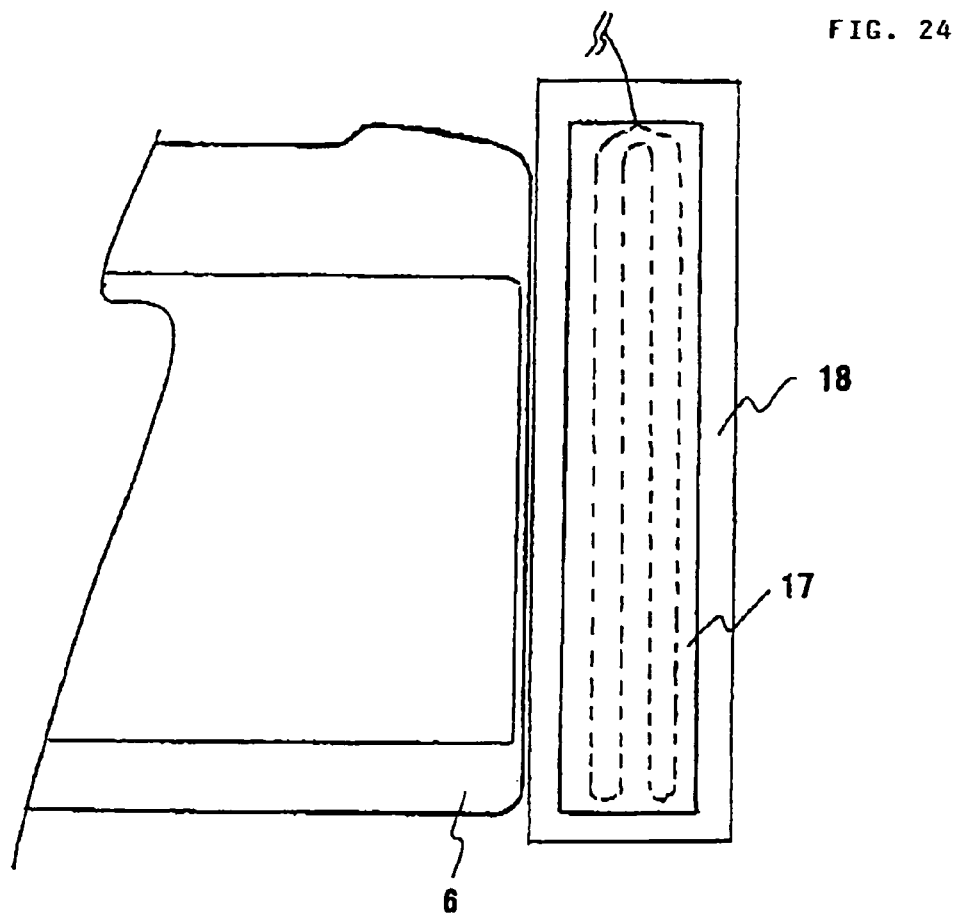
FIG. 24 is a planar view of part of the decorating apparatus that executes the decoration method which is an Example of the first invention appearing in claim 1 of the present invention.
Figure 25:
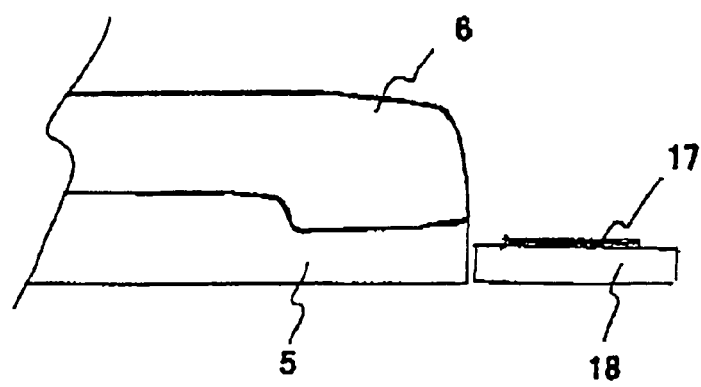
FIG. 25 is a front view of FIG. 24.
Figure 26:
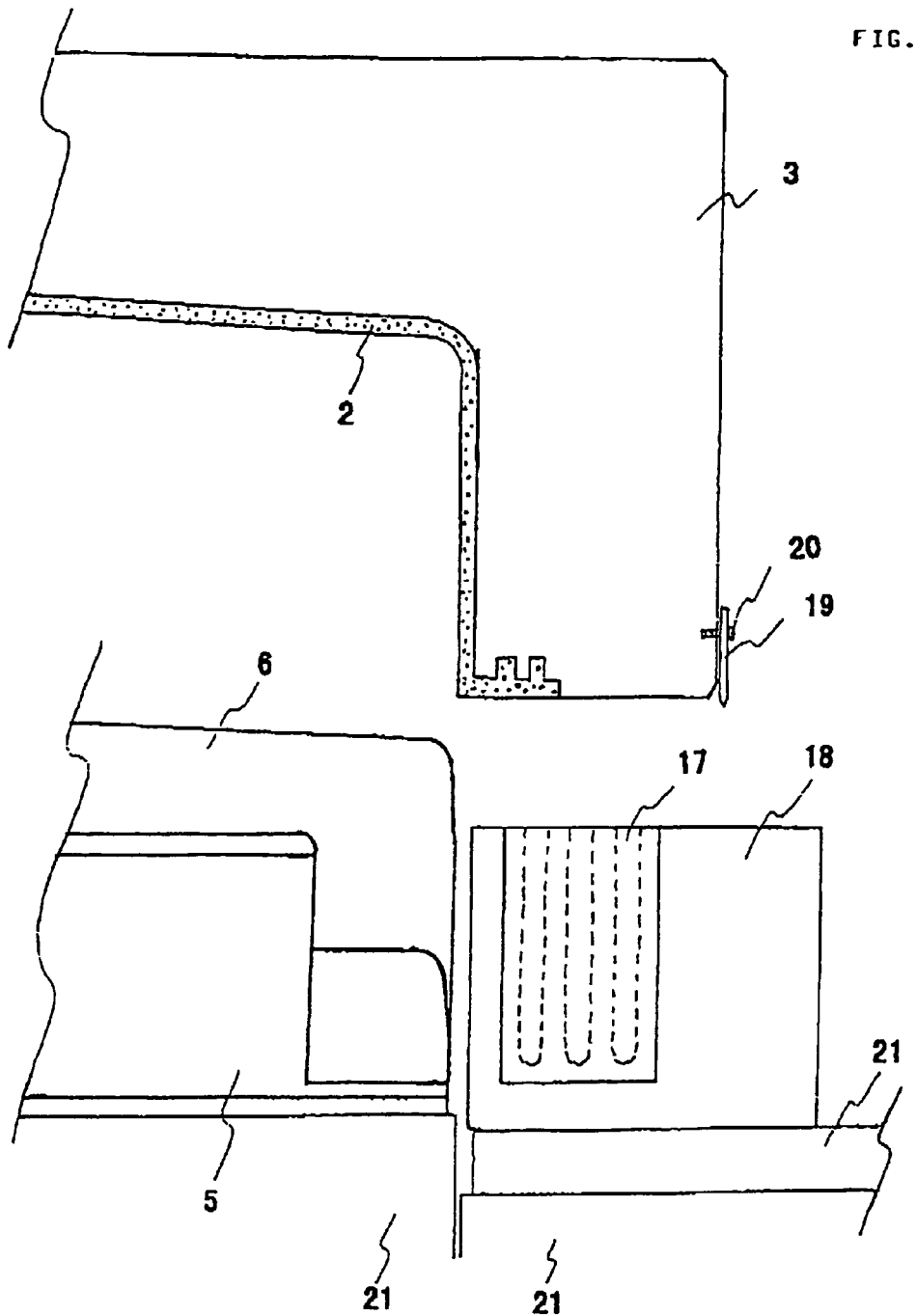
FIG. 26 is a front view of an Example of the second invention appearing in claim 2 of the present invention.
Figure 27:
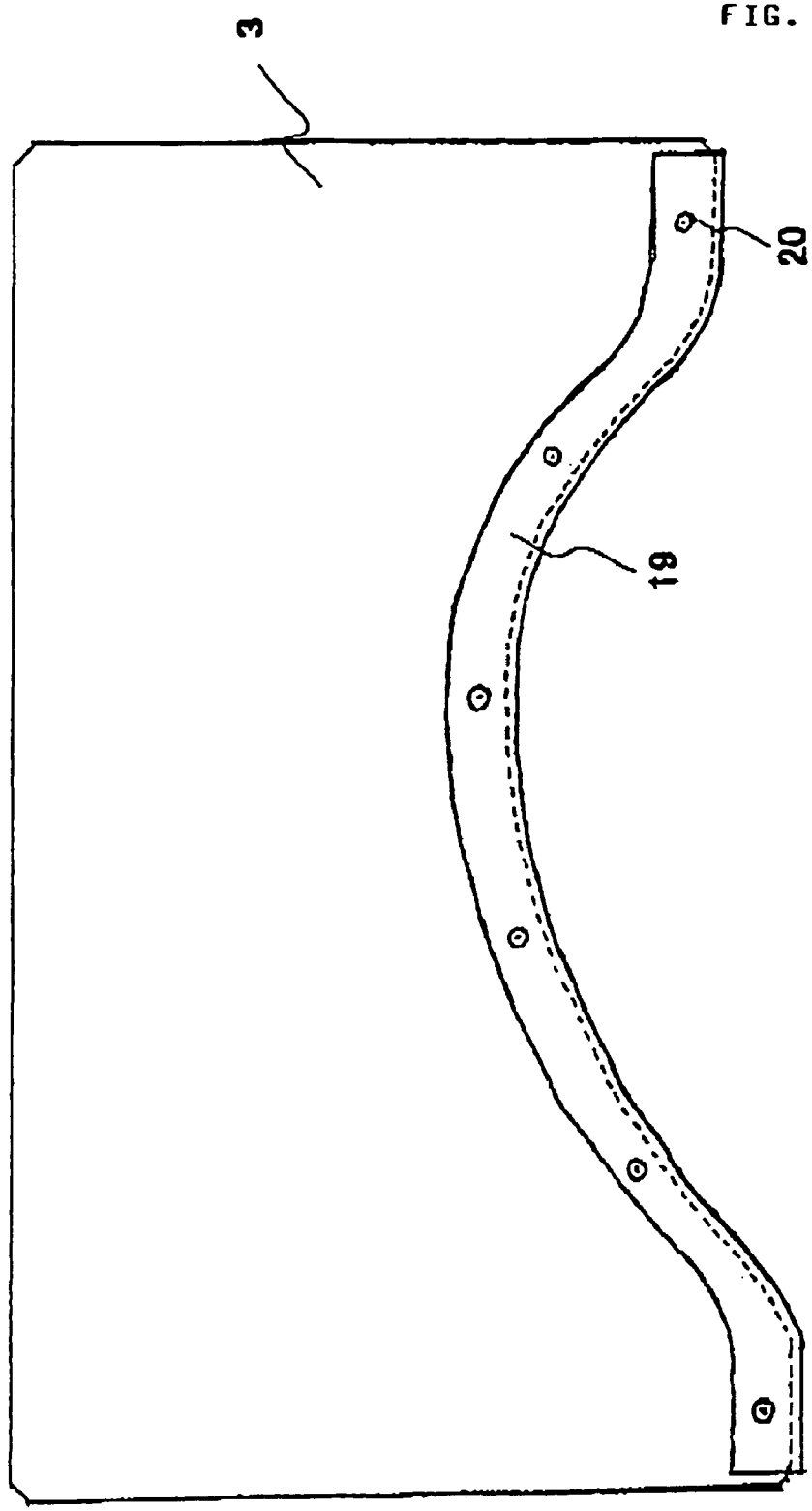
FIG. 27 is a side view showing the molded rubber mold of an Example of the second invention appearing in claim 2 of the present invention.

First, a description for an Example of the first invention alone is provided. The molded article possesses the shape shown in FIG. 6 and is an air conditioner grill. The dimensions of this molded article are: length 800 mm, width 200 mm, height 44 mm, and wall face height 23 mm.

Figure 28:
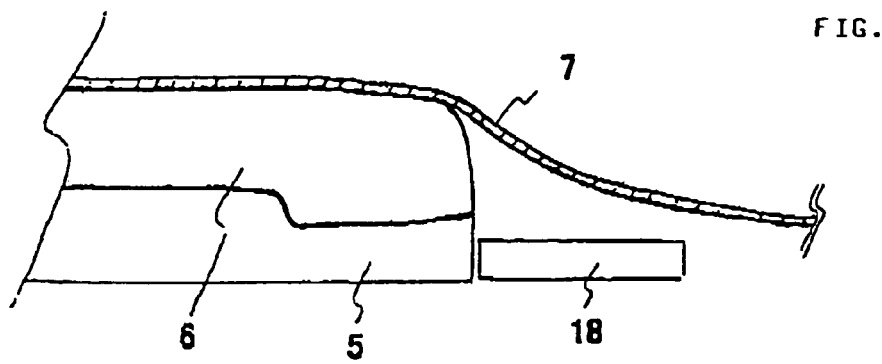
FIG. 28 is a front view of a state before thermal transfer foil removal.
Figure 29:
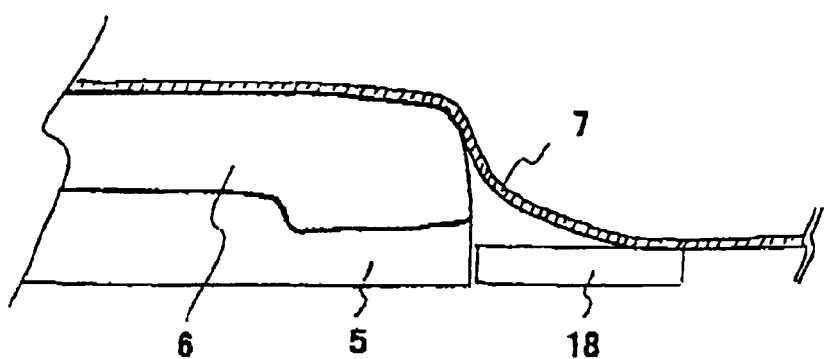
FIG. 29 is front view of a state during vacuum extraction in accordance with a conventional method.

States upon removal of the thermal transfer foil are illustrated in the drawings. Before vacuum extraction, the thermal transfer foil assumes a state like that in FIG. 28. Next, by means of vacuum extraction according to a conventional method, a state like that in FIG. 29 is assumed, and the thermal transfer foil 7 does not reach as far as the edges of the molded article 6.

Figure 31:
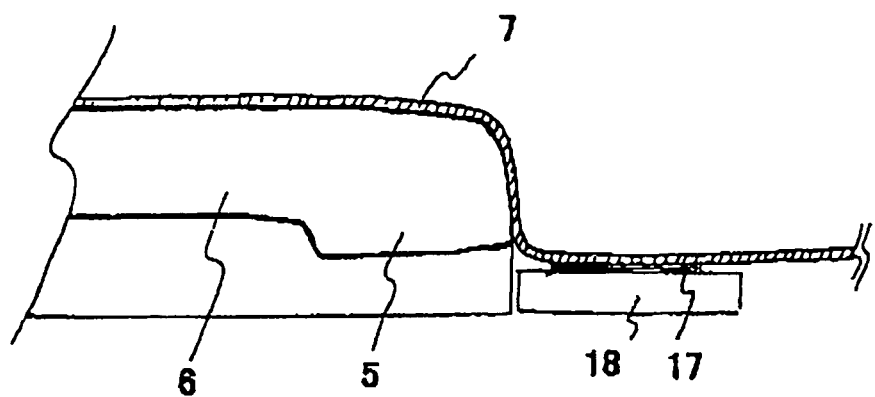
FIG. 31 is a front view of a state during vacuum extraction when implementing the first invention appearing in claim 1 of the present invention.

As shown in FIG. 31, in a state where a planar heater 17 (referred to as "side heater" hereinafter) is provided at the side of the molded article 6, when vacuum extraction is performed, since the thermal transfer foil 7 is partially heated and extended, it is possible to cause the thermal transfer foil 7 to adhere as far as the edges of the molded article 6.

Figure 30:
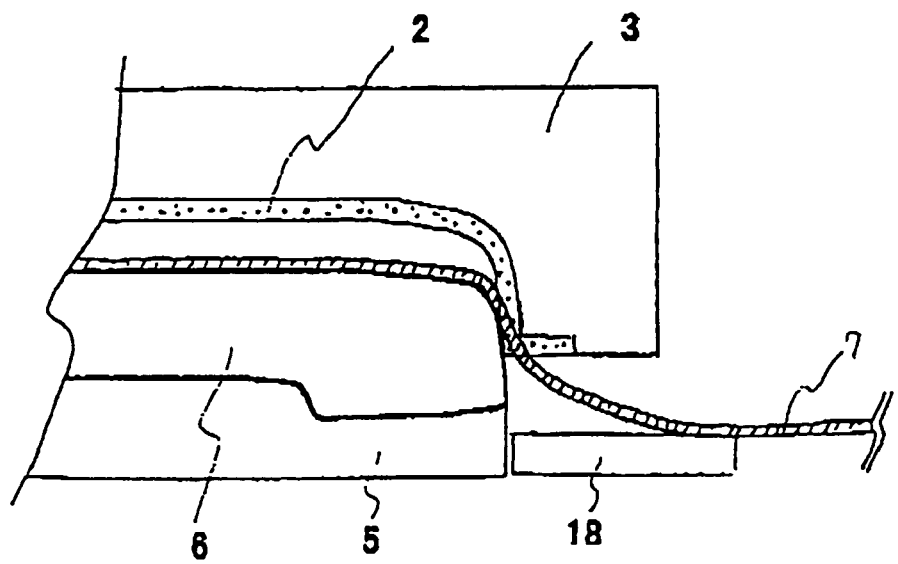
FIG. 30 is a front view of a state in which the molded rubber mold is caused to drop during the vacuum extraction in FIG. 29.

When, in the state described above, the molded rubber mold 2 is caused to drop, and design thermal transfer is performed, with a conventional method, as shown in FIG. 30, the edges of the molded rubber which are located on the molded rubber mold 2 collide with the thermal transfer foil 7, the thermal transfer foil 7 is torn, and vacuum breakage results. In addition, since parts of the molded rubber 3 are heated to 180° C., when collision is with free parts of the thermal transfer foil 7 which is produced using polyethylene terephthalate film, the thermal transfer foil 7 is instantly damaged.

Figure 32:
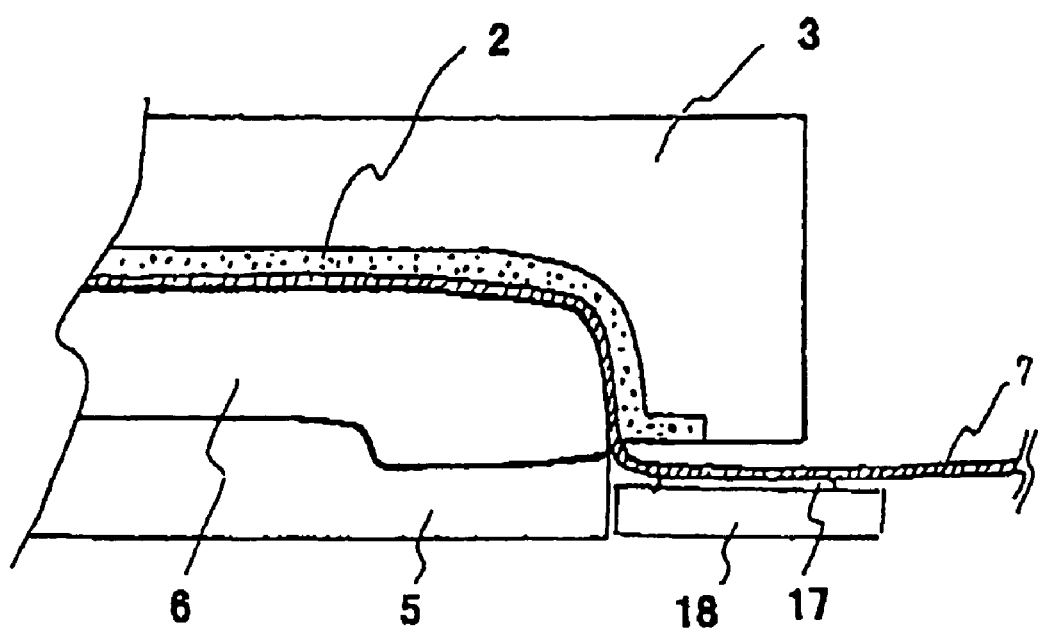
FIG. 32 is a front view of a state in which the molded rubber mold is caused to drop during the vacuum extraction in FIG. 30.

On the other hand, in the state in FIG. 32 at which point the present invention is used, since the thermal transfer foil 7 is cut so as to adequately drop as far as the lower edges of the molded article, even if the molded rubber mold 2 is caused to drop, no vacuum breakage occurs, and a favorable design transfer can be performed. A silicon rubber heater was used for the planar heater 17.

In addition, by applying silicon grease or similar to the surface of the molded rubber 3, which has parts of a rigid shape, if the coefficient of friction between the surface of the molded rubber 3 and the thermal transfer foil 7 is small, a more favorable design transfer can be performed.

Therefore, by means of a method employing the first invention of the present invention, favorable results were obtained when decoration with a wood grain pattern was performed with respect to an air conditioner grill of the shape shown in FIGS. 13 to 16.

Next, a description will be provided with reference to an Example in which the first invention and the second invention are employed jointly.

The molded article is an air conditioner grill possessing the shape shown in FIGS. 17 to 20. The dimensions of this molded article are: length 800 mm, width 270 mm, height 115 mm, and wall face height 30 mm. As shown in FIG. 86, when the molded article has a shape in which the side wall angle α is extremely small, even if the thermal transfer foil 7 is extended partially using the planar heater 17 such that same is attached to the edges of the molded article 6, ring-shaped cuts like those in FIG. 23 caused by contraction of the thermal transfer foil 7 following thermal transfer decoration no longer remain.

Figure 33:
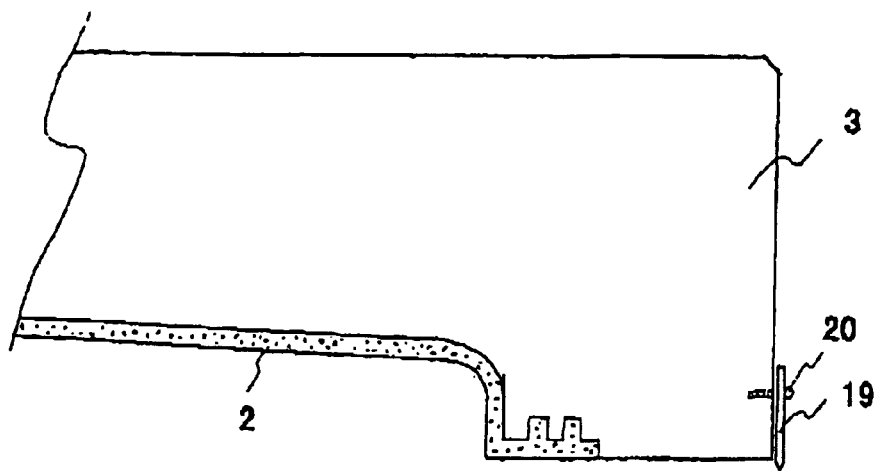
FIG. 33 is a cross-sectional view of when vacuum extraction is in progress in the Example of the second invention appearing in claim 2 of the present invention.
Figure 33:
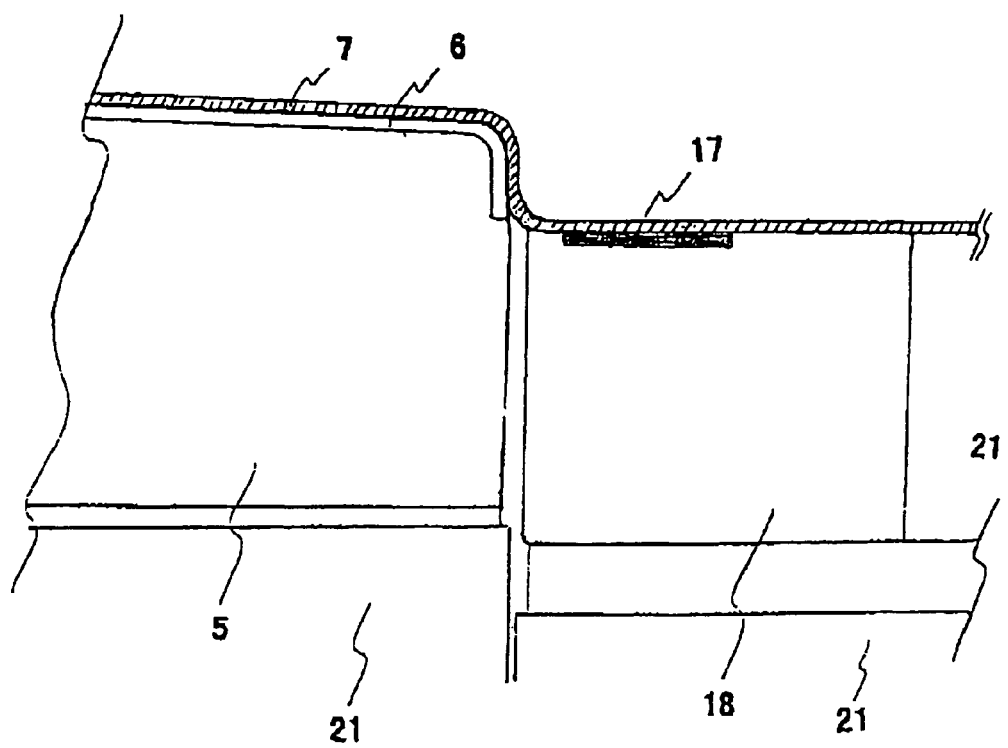
Figure 34:
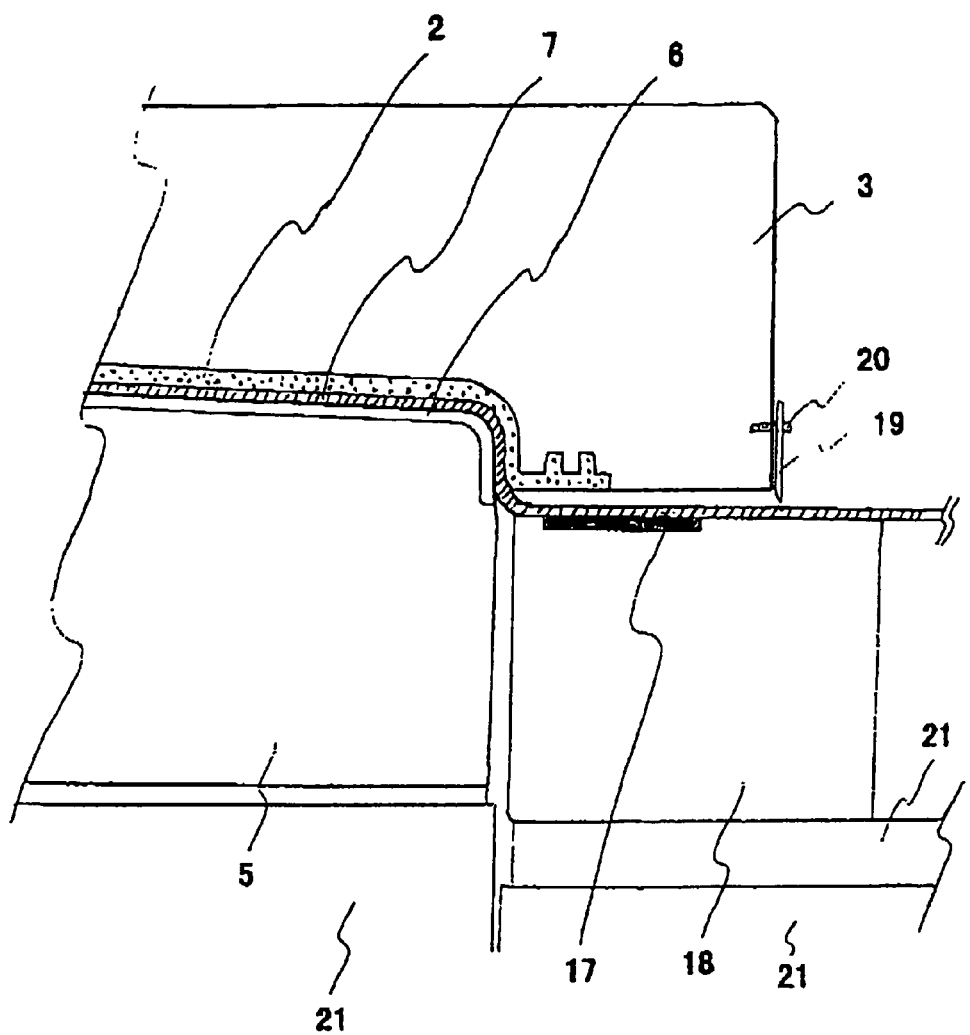
FIG. 34 is a cross-sectional view for immediately before the thermal transfer decoration in FIG. 33.
Figure 35:
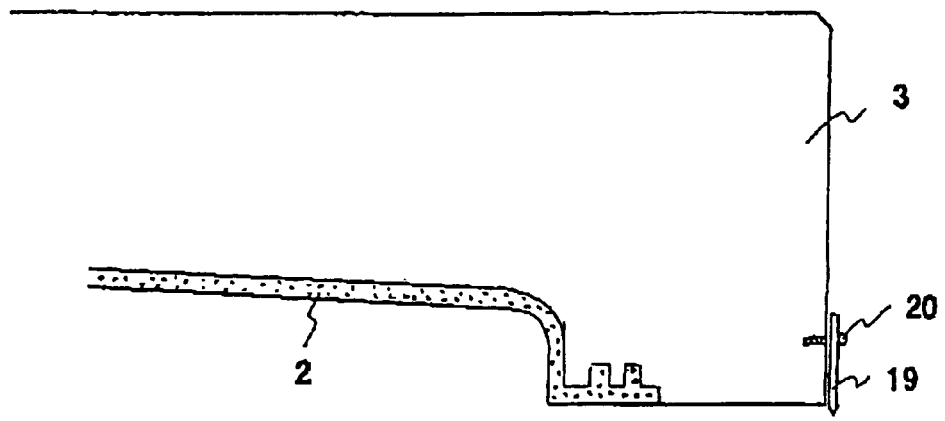
FIG. 35 is a cross-sectional view of when the thermal transfer decoration in FIG. 33 has been completed and after the molded rubber mold has been raised.
Figure 35:
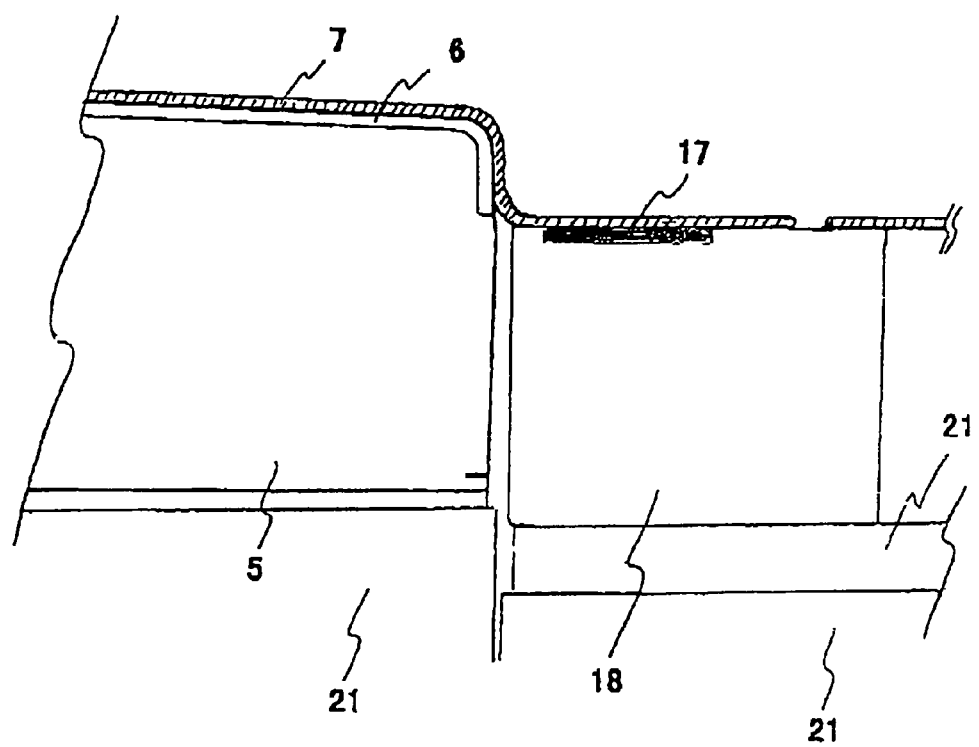

A cross-section through the center of the molded article is shown in FIG. 33 as an Example of the second invention. The thermal transfer foil 7 adheres to the molded article 6 as a result of vacuum extraction. The molded rubber mold 3 is caused to drop, and, when the molded rubber 3 is on the verge of reaching the surface of the molded article 6, the blade edge of the shape cutter 19 makes contact with and cuts the thermal transfer foil 7. Immediately thereafter, the molded rubber 3 reaches the surface of the molded article 6, and the design of the thermal transfer foil 7 is transferred. To describe this in more detail, before cutting, the thermal transfer foil 7 is caused to adhere to the molded article 6 in a state in which there are no wrinkles on same, and, since, immediately after cutting, the design is transferred to the molded article by the molded rubber 3 before wrinkles are produced, wrinkles are not observed on the molded article 6 thus decorated. Moreover, when the molded rubber mold 2 is raised, as shown in FIG. 35, since the thermal transfer foil 7 is cut, no ring-shaped cuts due to contraction of the thermal transfer foil 7 which has been forcibly extended were produced on the sides of the molded article. Incidentally, since the thermal transfer foil is cut in this method, a winding method cannot be employed.

Therefore, using the method which uses the first invention and the second invention of the present invention, favorable effects were obtained upon performing decoration with a wood grain design, with respect to an air conditioner grill of the shape shown in FIGS. 13 to 16.

The invention claimed is:

1. A method of decorating a surface of a large plastic molded article having a three-dimensional shape with a thermal transfer foil, said method comprising:
   positioning the molded article on a support jig comprising a perimeter;
   arranging a planar heater at the perimeter of the support jig;
   positioning the thermal transfer foil over the surface of the molded article;
   clamping the perimeter of the thermal transfer foil;
   partially heating the thermal transfer foil using the planar heater so as to extend same;
   attaching the foil to the molded article by vacuum degassing; and
   lowering and raising a molded rubber mold to contact the thermal transfer foil with the surface of the molded article.

2. A method of decorating a surface of a large plastic molded article having a three-dimensional shape with a thermal transfer foil, said method comprising:
   positioning the molded article on a support jig comprising a perimeter;
   arranging a planar heater at the perimeter of the support jig;
   positioning the thermal transfer foil over the surface of the molded article;
   clamping the perimeter of the thermal transfer foil;
   partially heating the thermal transfer foil using the planar heater so as to extend same;
   attaching the foil to the molded article by vacuum degassing;
   mounting a cutter on the perimeter of a molded rubber mold or on part thereof, and
   lowering and raising the molded rubber mold to contact the thermal transfer foil with the surface of the molded article,
   wherein the cutter cuts the thermal transfer foil immediately before the molded rubber mold reaches a drop point.

3. A method of decorating a surface of a large plastic molded article having a three-dimensional shape with a thermal transfer foil, said method comprising:
   positioning the molded article on a support jig comprising a perimeter;
   positioning the thermal transfer foil over the surface of the molded article;
   clamping the perimeter of the thermal transfer foil;
   attaching the foil to the molded article by vacuum degassing;
   providing a molded rubber mold comprising edges;

applying a lubricant to the edges of the molded rubber mold; and lowering and raising the molded rubber mold to contact the thermal transfer foil with the surface of the molded article, wherein the lubricant affords good slipping of the thermal transfer foil surface on the molded rubber surface.

* * * * *

UNITED STATES PATENT AND TRADEMARK OFFICE
CERTIFICATE OF CORRECTION

PATENT NO. : 7,504,061 B2
APPLICATION NO. : 10/513494
DATED : March 17, 2009
INVENTOR(S) : Hiroki Kondo Page 1 of 1

It is certified that error appears in the above-identified patent and that said Letters Patent is hereby corrected as shown below:

IN THE ABSTRACT:

Cover Page  now reads: "a thermal transfer foil (71)"
should read: -- a thermal transfer foil (7) --

IN THE SPECIFICATION:

Column 2, line 31  now reads: "and the thermal transfer foil is tom"
should read: -- and the thermal transfer foil is torn --

Column 3, line 31  now reads: "the foil being tom"
should read: -- the foil being torn --

Column 7, line 50  now reads: "Fig. 86"
should read: -- Fig. 20 --

Signed and Sealed this

Fourth Day of August, 2009

JOHN DOLL
*Acting Director of the United States Patent and Trademark Office*